(12) United States Patent
Akiyama et al.

(10) Patent No.: US 12,259,757 B2
(45) Date of Patent: Mar. 25, 2025

(54) MOBILE TERMINAL DEVICE

(71) Applicant: MAXELL, LTD., Kyoto (JP)

(72) Inventors: Hitoshi Akiyama, Kyoto (JP);
Yoshinori Okada, Kyoto (JP)

(73) Assignee: MAXELL, LTD., Kyoto (JP)

(*) Notice: Subject to any disclaimer, the term of this patent is extended or adjusted under 35 U.S.C. 154(b) by 141 days.

(21) Appl. No.: 18/249,845

(22) PCT Filed: Oct. 21, 2020

(86) PCT No.: PCT/JP2020/039600
§ 371 (c)(1),
(2) Date: Apr. 20, 2023

(87) PCT Pub. No.: WO2022/085127
PCT Pub. Date: Apr. 28, 2022

(65) Prior Publication Data
US 2023/0384831 A1    Nov. 30, 2023

(51) Int. Cl.
G06F 1/16      (2006.01)
G06F 3/01      (2006.01)
(Continued)

(52) U.S. Cl.
CPC .......... *G06F 1/1652* (2013.01); *G06F 1/1641* (2013.01); *G06F 1/1677* (2013.01);
(Continued)

(58) Field of Classification Search
CPC .... G06F 1/1652; G06F 1/1641; G06F 1/1677; G06F 1/1686; G06F 3/013; G06F 3/0412;
(Continued)

(56) References Cited

U.S. PATENT DOCUMENTS

2001/0005454 A1    6/2001  Nishino et al.
2002/0142810 A1*  10/2002  Kawasaki ........... H04M 1/0214
                                                      455/566
(Continued)

FOREIGN PATENT DOCUMENTS

JP    2001-186396 A    7/2001
JP    2004-15770 A     1/2004
(Continued)

OTHER PUBLICATIONS

International Search Report in the corresponding International Application No. PCT/JP2020/039600 dated Jan. 12, 2021, with English Translation (4 pages).

(Continued)

*Primary Examiner* — Adam R. Giesy
(74) *Attorney, Agent, or Firm* — Rimon P.C.

(57) ABSTRACT

A mobile terminal device including a camera for imaging the person to be photographed and a flexible and foldable display is provided with a line of sight detection unit for detecting a line of sight of the person to be photographed. Here, when photographing in the state where the mobile terminal device is folded, the mobile terminal device displays a mirror image on the display part on the side of the person to be photographed when it has been identified that the line of sight direction of the person to be photographed detected by the line of sight detection unit is directed to the display part on the side of the person to be photographed, the camera, or at least the mobile terminal device itself.

14 Claims, 18 Drawing Sheets

(51) Int. Cl.
*G06F 3/041* (2006.01)
*G06F 3/0488* (2022.01)
*G06F 3/04883* (2022.01)
*G06T 3/40* (2006.01)
*G06T 7/593* (2017.01)
*H04M 1/02* (2006.01)
*H04M 1/72454* (2021.01)
*H04N 13/30* (2018.01)

(52) U.S. Cl.
CPC ............ *G06F 1/1686* (2013.01); *G06F 3/013* (2013.01); *G06F 3/0412* (2013.01); *G06F 3/0488* (2013.01); *G06F 3/04883* (2013.01); *G06T 3/40* (2013.01); *G06T 7/593* (2017.01); *H04M 1/0268* (2013.01); *H04M 1/72454* (2021.01); *G06F 2203/04803* (2013.01); *H04M 1/0214* (2013.01); *H04M 2250/52* (2013.01); *H04N 2013/40* (2018.05)

(58) Field of Classification Search
CPC ............... G06F 3/0488; G06F 3/04883; G06F 2203/04803; G06T 3/40; G06T 7/593; H04M 1/0268; H04M 1/72454; H04M 1/0214; H04M 2250/52; H04N 2013/40
See application file for complete search history.

(56) References Cited

U.S. PATENT DOCUMENTS

| | | |
|---|---|---|
| 2004/0008266 A1 | 1/2004 | Kitada et al. |
| 2009/0174803 A1* | 7/2009 | Nishino ............... H04M 1/0216 348/E5.022 |
| 2017/0075479 A1 | 3/2017 | Tsukamoto |
| 2019/0294239 A1* | 9/2019 | Suzuki ............... G02B 27/0179 |

FOREIGN PATENT DOCUMENTS

| | | |
|---|---|---|
| JP | 2004-187182 A | 7/2004 |
| JP | 2007079157 A | 3/2007 |
| JP | 2010211500 A | 9/2010 |
| JP | 2013-186232 A | 9/2013 |
| JP | 2014220555 A | 11/2014 |
| JP | 2017-054471 A | 3/2017 |
| KR | 20110003817 A | 1/2011 |

OTHER PUBLICATIONS

Notice of Reasons for Refusal received in corresponding Japanese Patent Application No. 2024-063672, dated Nov. 19, 2024.

* cited by examiner

MOBILE TERMINAL DEVICE

CROSS REFERENCE TO RELATED APPLICATIONS

This application is the U.S. National Phase under 35 U.S.C. § 371 of International Application No. PCT/JP2020/039600, filed on Oct. 21, 2020, and the entire contents of each of which Applications are hereby incorporated by reference in their entirety.

TECHNICAL FIELD

The present invention relates to a mobile terminal device having an imaging function for imaging a subject.

BACKGROUND ART

Mobile terminal devices having information management functions such as a camera, a telephone, a memo, and a schedule are generally palm-sized, can display captured images and various types of information on a display screen, can also make calls, and are easy to use and widely prevalent.

Conventional mobile terminal devices have a flat panel display made of liquid crystal and the like on the front surface thereof, but in recent years, mobile terminal devices using a flexible display that is bendable and foldable have emerged. A mobile terminal device equipped with a foldable display can be used as a single display completely when opened, which makes it possible to increase the size of the display screen. As a flexible display, for example, organic electro luminescence (organic EL) using a bendable plastic substrate is adopted instead of a glass substrate that is difficult to bend used in a liquid crystal panel or the like. As for the shape, in addition to the inward-folding type in which the displays are provided on both inner surfaces of the folded mobile terminal device, the outward-folding type in which the displays are provided on both outer surfaces when the mobile terminal device is folded has also been presented, and further spread has been expected.

In addition, the imaging function by the camera is becoming more and more advanced and is making dramatic progresses such as the increase in the number of pixels, the triple lenses, and the increase in the magnification of optical zoom, so that it is becoming easy for anyone to take beautiful images with the camera.

In such a circumstance, there are many opportunities to photograph someone and to be photographed by someone, but it is difficult to know how he or she appears in the image during imaging, and it cannot be known before seeing the image after imaging in many cases.

In this respect, a technique in which the image captured by the camera is displayed on both the front main display unit which is seen by the photographer and the rear sub-display unit and the person to be photographed checks how he or she appears by looking at the rear sub-display unit has been known.

For example, Patent Document 1 (Japanese Unexamined Patent Application Publication No. 2004-015770) discloses a technique of "a mobile terminal device equipped with a camera including a lens and an imaging element for imaging an imaging target, and the mobile terminal device includes a first screen provided on the same side as the lens, a second screen provided on a side different from the side where the lens is provided, and means for displaying an image captured by directing the lens toward the imaging target on the first screen and the second screen". In addition, Patent Document 2 (Japanese Unexamined Patent Application Publication No. 2004-187182) discloses a technique of "a mobile terminal device including a first camera and a first display unit provided on a front surface of a housing and a second camera and a second display unit provided on a rear surface of the housing, and when an image captured by the first camera or the second camera is selected and displayed on the first display unit and the second display unit, a mirror image is displayed on the display unit that is arranged on the same side as the selected camera". In other words, this is a technique of providing a sub-display unit that can be seen from the person to be photographed such that the person to be photographed can visually check how he or she appears in the image.

RELATED ART DOCUMENTS

Patent Documents

Patent Document 1: Japanese Unexamined Patent Application Publication No. 2004-015770

Patent Document 2: Japanese Unexamined Patent Application Publication No. 2004-187182

SUMMARY OF THE INVENTION

Problems to be Solved by the Invention

Patent Document 1 and Patent Document 2 mentioned above describe that the sub-display unit that can be seen from the person to be photographed is provided such that the person to be photographed visually checks how he or she appears in the image, but they do not describe and suggest the mobile terminal device equipped with a foldable display at all. Further, since the image captured by the camera is unnecessarily displayed on the sub-display unit even when the person to be photographed does not see the sub-display unit, power consumption increases unnecessarily, and the operation time of the mobile terminal device becomes shorter unnecessarily. Also, when the captured image is displayed on the sub-display unit seen from the side of the person to be photographed, the captured image will be shown to the people who do not relate to the person to be photographed.

An object of the invention of this application is to provide a user-friendly mobile terminal device having an imaging function with which the power consumption can be reduced by preventing unnecessary displaying and a person to be photographed can visually check how he or she appears in the image easily during imaging.

Means for Solving the Problem

A mobile terminal device includes: an imaging unit configured to image a person to be photographed; a first display part configured to display an image captured by the imaging unit; a second display part configured to display a processed image obtained by processing the image; a line of sight direction detection unit configured to detect a line of sight direction of the person to be photographed; a determination unit configured to determine whether or not the person to be photographed is facing a presence direction of the mobile terminal device based on a detection result of the line of sight direction detection unit; and a control unit configured to control display/non-display of the processed image on the second display part based on a determination result of the determination unit. Here, the first display part is provided at a position that can be visually recognized by a photographer and the second display part is provided at a position that can be visually recognized by the person to be photographed. Further, the control unit is configured to display the processed image on the second display part when the determination unit has determined that the person to be photographed is facing the presence direction of the mobile terminal device, and is configured not to display the processed image when the determination unit has determined that the person to be photographed is not facing the presence direction of the mobile terminal device.

Effects of the Invention

According to one embodiment, it is possible to provide a user-friendly mobile terminal device equipped with a foldable display with which the power consumption can be reduced by preventing unnecessary displaying and a person to be photographed can visually check how he or she appears in the image easily during imaging.

BRIEF DESCRIPTIONS OF THE DRAWINGS

DETAILED DESCRIPTION OF PREFERRED EMBODIMENTS

Figure 1:
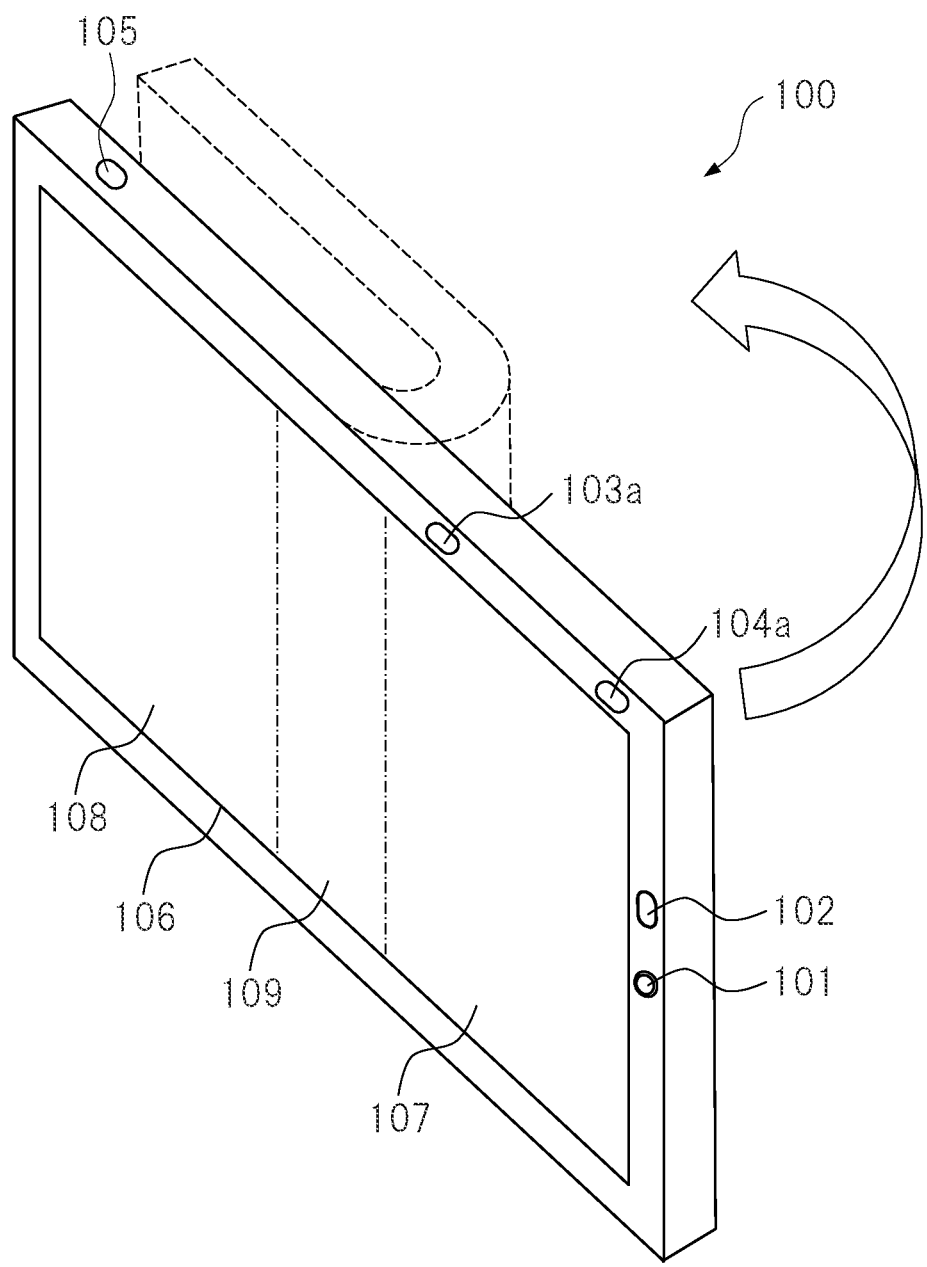
FIG. 1 is a diagram schematically showing an external appearance of a mobile terminal device.

In all the drawings for describing the embodiments, the same members are denoted by the same reference characters in principle, and repetitive description thereof will be omitted. Note that hatching may be applied even in plan views in order to make the drawings easily understood.

First Embodiment

<External Configuration of Mobile Terminal Device>

FIG. 1 is a diagram schematically showing an external configuration of a mobile terminal device.

In FIG. 1, a mobile terminal device 100 includes a camera (imaging unit) 101, a depth sensor 102, a first left-eye line of sight detector 103a, a first right-eye line of sight detector 104a, a camera operation switch 105, and a foldable display 106.

The camera 101 is configured to photograph surrounding people and scenery.

The depth sensor 102 is a sensor that stereoscopically captures the shape of an object such as a person or a thing, and is configured to be able to measure the distance and angle to the object.

The first left-eye line of sight detector 103a and the first right-eye line of sight detector 104a have the function of detecting the movements of the left and right eyes of a person to be photographed 130 photographed by the camera 101, respectively, and can stereoscopically identify the line of sight destination by detecting the lines of sight of both the left and right eyes. The first left-eye line of sight detector 103a and the first right-eye line of sight detector 104a are arranged so as to have the same arrangement direction as that of the left and right eyes of a person to be photographed who is generally upright when photographed by the camera 101, so that the line of sight can be detected more accurately. Note that the number of line of sight detectors may be one, and a performance close to that of the line of sight detection for both eyes can be obtained when the person to be photographed is relatively far from the mobile terminal device 100.

The camera operation switch 105 is a switch which a photographer presses when starting or stopping photographing with the camera 101.

When photographing with the mobile terminal device 100 folded, it is folded in the direction in which the camera 101 faces the person to be photographed. The display 106 is separately composed of a display part (second display part) 107 seen from the side of the person to be photographed, a display part (first display part) 108 seen from the side of a photographer, and a non-display part 109 which is not used for displaying when the mobile terminal device 100 is folded at a folding hinge.

Figure 2:
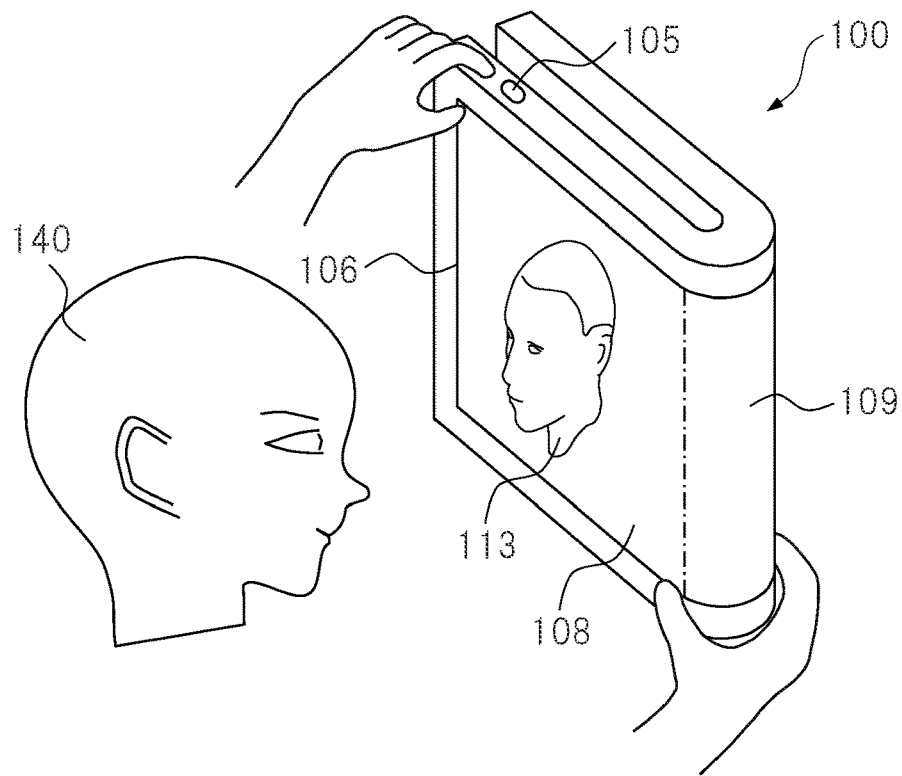
FIG. 2 is a diagram schematically showing the external appearance seen from a side of a photographer in a state where the mobile terminal device is folded.

FIG. 2 is a diagram showing an overall appearance seen from a side of a photographer in a state where the mobile terminal device is folded. In the state shown in FIG. 2, when a photographer 140 operates the camera operation switch 105 to start photographing, an image 113 photographed by the camera 101 is displayed as a normal image on the display part 108 of the display 106 on the side of the photographer 140.

Figure 3:
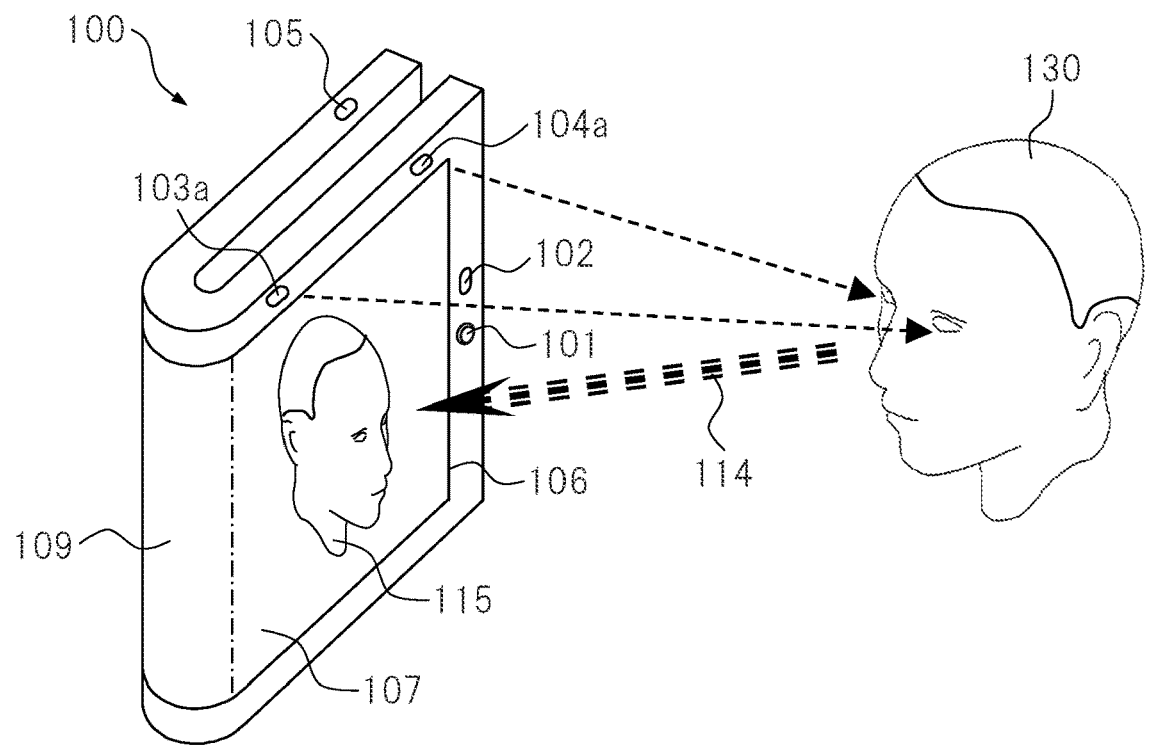
FIG. 3 is a diagram schematically showing the external appearance seen from a side of a person to be photographed in a state where the mobile terminal device is folded.

FIG. 3 is a diagram showing an overall appearance seen from a side of the person to be photographed in a state where the mobile terminal device is folded. In the display 106, a processed image obtained by performing image processing on the image 113 is displayed on the display part 107 on the side of the person to be photographed 130. Specifically, the display part 107 displays a mirror image 115 that is a laterally inverted mirror image of the image 113. Therefore, in the state where the mobile terminal device 100 is folded, the photographer 140 can check the person to be photographed 130 and others (see FIG. 2) by looking at the image 113 displayed on the display part 108 on the side of the photographer 140. On the other hand, the person to be photographed 130 can see the figure of himself or herself being photographed by looking at the mirror image 115 displayed on the display part 107 on the side of the person to be photographed 130. Therefore, the person to be photographed 130 can easily visually check how he or she appears in the image during imaging.

Note that a software button (not shown) displayed on the display part 108 on the side of the photographer 140 may be used instead of the camera operation switch 105 for starting photographing with the camera 101. Further, it is also possible to display the image 113 instead of the mirror image 115 on the display part 107 on the side of the person to be photographed 130, and the image to be displayed may be switched by setting input.

<Configuration of Mobile Terminal Device>

Figure 4:
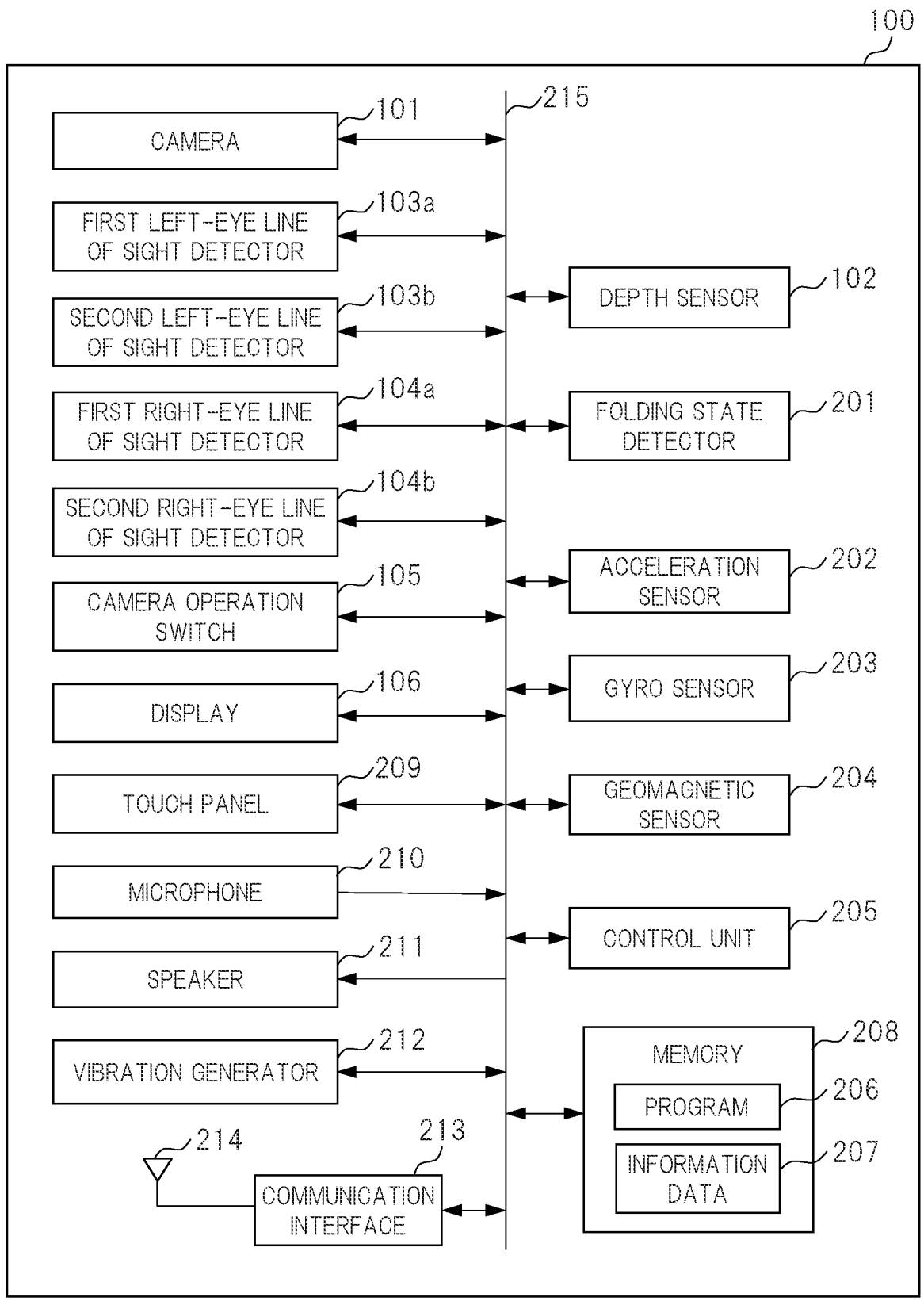
FIG. 4 is a block diagram showing a configuration of the mobile terminal device.

FIG. 4 is a block diagram showing a configuration example of the mobile terminal device.

In FIG. 4, the mobile terminal device 100 includes the camera 101, the depth sensor 102, the first left-eye line of sight detector 103a, a second left-eye line of sight detector 103b, the first right-eye line of sight detector 104a, a second right-eye line of sight detector 104b, the camera operation switch 105, the display 106, a folding state detector 201, an acceleration sensor 202, a gyro sensor 203, a geomagnetic sensor 204, a control unit 205, a memory 208 storing a program 206 and information data 207, a touch panel 209, a microphone 210, a speaker 211, a vibration generator 212, a communication interface 213, and a transmission/reception antenna 214 as appropriate, and these components are mutually connected via a bus 215 except the transmission/reception antenna 214.

The camera 101 is for photographing the field of view around the front, and can photograph the person to be photographed in front regardless of the folded state.

The depth sensor 102 is a sensor that can stereoscopically capture the shape of an object such as a person or a thing, and can measure the distance and angle to the object. As the depth sensor 102, for example, Light Detection and Ranging (LiDAR) which irradiates an object with laser light such as infrared ray and measures the returning scattered light, thereby analyzing and detecting the distance to a distant object and the state of that object, a TOF (Time of Flight) sensor which irradiates a subject with pulsed light and measures the reflection time of the pulsed light for each pixel, thereby measuring the distance, and a millimeter wave radar which emits millimeter radio waves and captures the reflected waves thereof, thereby detecting the distance to the reflecting object and the state of the object are used.

The depth sensor 102 is one configuration example of person detection and both eye identification processing means for detecting a person and identifying both eyes from the face of the detected person. Thus, in the state where the person to be photographed is photographed by the camera 101, the person to be photographed can be captured as a person and the left eye and the right eye in the face can be found and identified. The first left-eye line of sight detector 103a, the second left-eye line of sight detector 103b, the first right-eye line of sight detector 104a, and the second right-eye line of sight detector 104b capture the movements and orientations of the right eye and the left eye, respectively, and detect the lines of sight thereof.

As the process for detecting the line of sight, the technique generally used as an eye tracking process can be used. For example, as a method utilizing corneal reflection, a technique in which an infrared LED (Light Emitting Diode) is irradiated on the face and photographed by an infrared camera, the position of the reflected light emitted by the irradiation of the infrared LED on the cornea (corneal reflection) is set as a reference point, and the line of sight is detected based on the position of the pupil with respect to the position of the corneal reflection is known. Further, a method in which the inner corner of the eye is set as a reference point by photographing the eye by a visible light camera, the iris is set as a variable point, and the line of sight is detected based on the position of the iris with respect to the inner corner of the eye is also known.

As shown in FIG. 3, when the display 106 of the mobile terminal device 100 is folded horizontally, the first left-eye line of sight detector 103a and the first right-eye line of sight detector 104b located horizontally on the mobile terminal device 100 are arranged substantially in the same direction as the arrangement direction of both eyes of the person to be photographed who is in an upright posture when photographed in general, and the line of sight can be detected more accurately.

The folding state detector 201 is composed of, for example, a pair of Hall elements and a pair of magnets, and detects whether or not both end faces of the mobile terminal device 100 approach each other and the mobile terminal device 100 is in a folded state. The Hall element is a sensor that measures magnetic flux density by using the Hall effect, and can detect the approach of a magnet by measuring a strong magnetic flux density when the magnet approaches. Also, as the folding state detector 201, instead of the configuration using the Hall element, for example, a magnetoresistive element using a magnetoresistive effect whose resistance value changes when a magnetic field is applied can be used.

Figure 5:
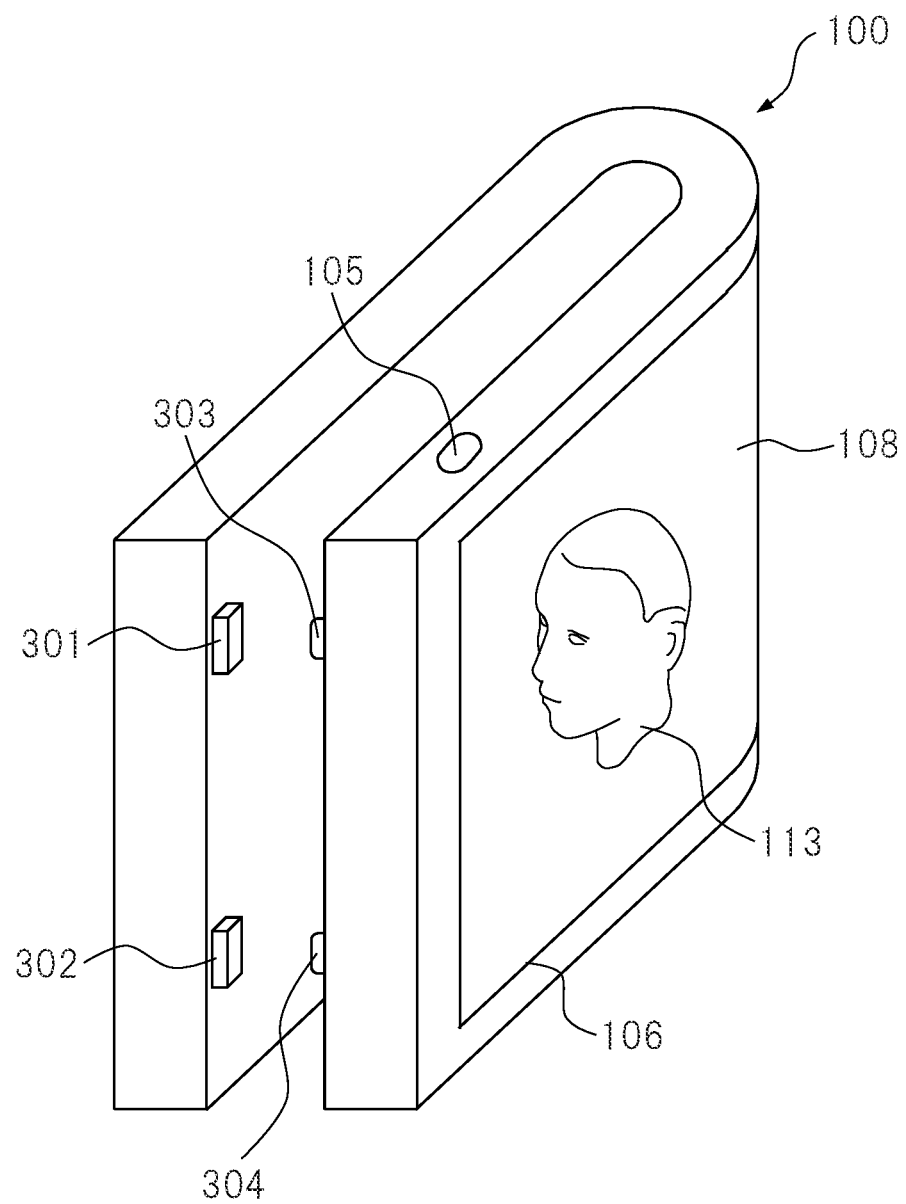
FIG. 5 is a diagram showing a configuration for detecting a folded state.

FIG. 5 is a diagram for describing the detailed structure of the folding state detector 201.

As shown in FIG. 5, the mobile terminal device 100 includes the Hall elements 301 and 302 on one folded end face and the magnets 303 and 304 on the other end face. The Hall element is a sensor that measures magnetic flux density by using the Hall effect, and can detect the approach of a magnet by measuring a strong magnetic flux density when the magnet approaches. When the mobile terminal device 100 is folded, both end faces of the mobile terminal device 100 come close to each other. Consequently, the Hall element 301 measures the strong magnetic flux density from the magnet 303 and detects the approach of both end faces of the mobile terminal device 100. Similarly, the Hall element 302 measures the strong magnetic flux density from the magnet 304 and detects the approach of both end faces of the mobile terminal device 100. Therefore, it is possible to detect whether or not the two end faces of the mobile terminal device 100 are in a close state, that is, whether or not the mobile terminal device 100 is in a folded state by the Hall elements 301 and 302 and the magnets 303 and 304.

As the folding state detector 201 for detecting whether or not both end faces of the mobile terminal device 100 approach each other and the mobile terminal device 100 is in a folded state, the configuration other than the configuration using the Hall element described with reference to FIG. 5 may be used. For example, a magnetoresistive element using a magnetoresistive effect whose resistance value changes when a magnetic field is applied can be used, or an electric switch incorporated in the hinge portion of the mobile terminal device 100 can also be used.

In FIG. 4, the acceleration sensor 202 is a sensor that captures movement, vibration, impact, and the like, and can detect the tilt and orientation of the mobile terminal device 100.

The gyro sensor 203 is a sensor that detects an angular velocity in a rotating direction, and can capture the states of vertical, horizontal, and oblique postures.

The geomagnetic sensor 204 is a sensor that detects the magnetic force of the earth, and detects the direction in which the mobile terminal device 100 is facing. Note that it is also possible to detect the movement of the mobile terminal device 100 by capturing the changes in the geomagnetism with respect to the movement of the mobile terminal device 100 by the use of a three-axis type that detects geomagnetism in the vertical direction in addition to the front-rear direction and the left-right direction.

The control unit 205 is composed of a CPU or the like, and performs the overall operation control of the mobile terminal device 100 by executing the program 206 such as an operating system (OS) and an operation control application stored in the memory 208 to control each component.

For example, when the camera 101 is in a photographing operation in the state where the mobile terminal device 100 is folded, if it is determined that the line of sight destination of the person to be photographed detected by the line of sight detector is directed to the display part 107 on the side of the person to be photographed, the camera 101, or at least the mobile terminal device 100 itself, the display part 107 on the side of the person to be photographed is controlled to display the mirror image 115 obtained by performing image processing on the image photographed by the camera 101. On the other hand, if it is determined that the line of sight destination of the person to be photographed is not directed to the display part 107 on the side of the person to be photographed, the camera 101, or the mobile terminal device 100 itself, the display part 107 on the side of the person to be photographed is controlled to be put into a non-display state. Also, the display part 108 on the side of the photographer is controlled to display the person to be photographed as a normal image of the image 113 photographed by the camera 101 as it is.

The memory 208 is composed of a flash memory or the like, and stores the program 206 such as the operating system and the operation control application used by the control unit 205. Further, it also stores the information data 207 such as images, sounds, and signals handled by the mobile terminal device 100. As the information data 207, for example, image data captured by the camera 101 can be presented.

The display 106 is composed of a bendable flexible display panel, and is arranged on both outer surfaces when the mobile terminal device 100 is folded. As the flexible display panel, for example, an organic EL panel using a flexible plastic substrate is adopted.

In the state where the mobile terminal device 100 is folded, different images are separately displayed on the display part 107 seen from the person to be photographed and the display part 108 seen from the photographer. On the other hand, in the open state, it becomes a completely single display and a large display unit can be realized. Further, in addition to displaying images and videos, the display 106 also displays a screen showing input operations, displays notification information to the user such as the remaining battery level, various alarms, and time, and displays icons of applications to be started within the display screen, etc.

The touch panel 209 is made of a highly transparent material and detects the position and area touched by the finger on the screen. The touch panel 209 is provided on the surface of the mobile terminal device 100 so as to overlap the upper layer of the display 106, and can detect a touched position on the display surface of the display 106.

In addition, the touch panel 209 constitutes an input operation unit that allows an input operation to be performed by touching the touch panel 209 while looking at a display object displayed on the display 106, and can detect an approach or contact operation by a finger or a touch pen as an operation input. For example, when a plurality of persons to be photographed are displayed on the display part 107 on the side of the person to be photographed, the display position of a specific person to be photographed can be captured as input information by touching the display position. In addition, it is also possible to easily perform the input operation by selecting and specifying an icon indicating instruction information on the display screen or an icon of an application or a file by touch operation.

The microphone 210 collects sounds from the outside and the voice of the user.

The speaker 211 outputs sounds to the outside and notifies the photographer holding the mobile terminal device 100 of notification information and the like by sound. For example, when the line of sight detector has detected and identified that the person to be photographed is gazing at the display part on the side of the person to be photographed, the gaze state of the person to be photographed is notified by sound, so that the photographer can easily recognize the gaze state of the person to be photographed.

The vibration generator 212 generates vibration in response to a control instruction from the control unit 205, and can notify the photographer holding the mobile terminal device 100 of the notification information by vibration by converting the notification information emitted in the mobile terminal device 100 into vibration. For example, when the line of sight detector has detected and identified that the person to be photographed is gazing at the display part on the side of the person to be photographed, the gaze state of the person to be photographed is notified by vibration, so that the photographer can reliably recognize the gaze state of the person to be photographed.

The communication interface 213 performs wireless communication with a server device or the like in another location by the short-range wireless communication, the wireless LAN, or the base station communication, and transmits and receives image data captured by the camera and control signals with the server device or the like via the transmission/reception antenna 214 when performing the wireless communication.

As the short-range wireless communication, for example, the electronic tags, Bluetooth (registered trademark), and Wi-Fi (registered trademark) can be used. Further, as the base station communication, for example, the long-distance wireless communication such as LTE (Long Term Evolution) and GSM (Global System for Mobile communications, (registered trademark)) can be used. Although not shown, the communication interface 213 may use other methods such as optical communication or sound wave communication as means of wireless communication. In such cases, a light emission/reception unit and a sound wave output/sound wave input unit are respectively used instead of the transmission/reception antenna 214. For example, the convenience of the photographer and the person to be photographed can be improved by transmitting and receiving various information such as the result of line of sight detection by the wireless communication with the mobile terminal device 100 held by the person to be photographed.

According to the mobile terminal device 100 thus configured, when the mobile terminal device 100 is folded, the processed image obtained by performing the image processing on the camera image based on the camera image photographed by the camera 101 (for example, mirror image) can be displayed on the display part on the side of the person to be photographed. As a result, according to the mobile terminal device 100, the person to be photographed can see the figure of himself or herself displayed on the display part on the side of the person to be photographed, which makes it possible to visually check how he or she appears in the image easily during imaging.

<Functional Block Configuration of Mobile Terminal Device>

Next, in the mobile terminal device 100 having the above-described configuration, the functional block configuration focusing on the functions realized by the mobile terminal device 100 will be described.

Figure 6:
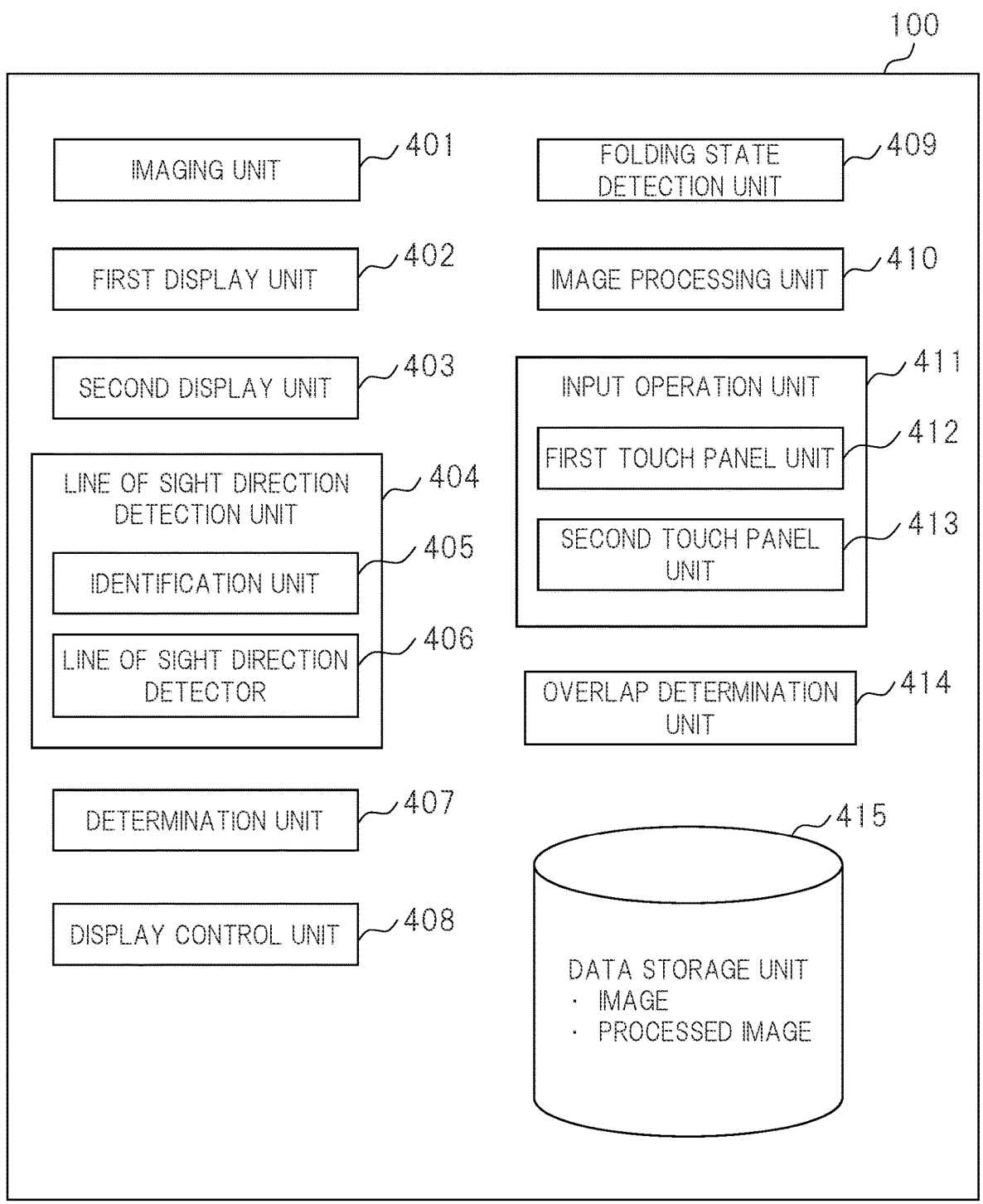
FIG. 6 is a functional block diagram showing a functional configuration of the mobile terminal device.

FIG. 6 is a diagram showing the functional block configuration of the mobile terminal device.

Here, in the functional block diagram shown in FIG. 6, not only the components related to the first embodiment but also the components related to other embodiments are shown. The components related to other embodiments will be described in related embodiments.

An imaging unit 401 is built in the mobile terminal device 100, and is composed of, for example, a camera for imaging a person to be photographed. The image captured by the imaging unit 401 is stored in a data storage unit 415.

A first display part 402 is configured to display the image captured by the imaging unit 401, and is provided at a position that can be visually recognized from the photographer. For example, the first display part 402 corresponds to the display part 108 in FIG. 2.

A second display part 403 is configured to display the processed image obtained by processing the image captured by the imaging unit 401, and is provided at a position that can be visually recognized from the person to be photographed. For example, the second display part 403 corresponds to the display part 107 in FIG. 3.

In this specification, an "image" means an image as it is captured by the imaging unit 401. On the other hand, a "processed image" means an image obtained by performing image processing on the image captured by the imaging unit 401. For example, the "processed image" corresponds to the image obtained by performing image processing by the image processing unit 410. Namely, the image processing unit 410 is configured to perform image processing on the image captured by the imaging unit 401. For example, the image processing unit 410 generates a mirror image that is a laterally inverted mirror image with respect to the image captured by the imaging unit 401. The processed image obtained by the image processing by the image processing unit 410 is also stored in the data storage unit 415 in the same manner as the image captured by the imaging unit 401. Namely, the data storage unit 415 is configured to store data such as images and processed images.

The first display part 402 basically displays the image, but may display the processed image in some cases. Similarly, the second display part 403 basically displays the processed image, but may display the image in some cases.

For example, as shown in FIG. 1, the mobile terminal device 100 is configured to be flexible and foldable. When the mobile terminal device is not folded, the display part 108 constituting the first display part 402 and the display part 107 constituting the second display part 403 form an integrated flat display part (see FIG. 1). On the other hand, when the mobile terminal device 100 is folded, the display part 108 constituting the first display part 402 and the display part 107 constituting the second display part 403 are arranged at mutually opposite positions (see FIG. 2 and FIG. 3).

Therefore, in order to change the display mode depending on whether or not the mobile terminal device 100 is folded, the mobile terminal device 100 is provided with a folding state detection unit 409 configured to detect whether or not the mobile terminal device 100 is folded. Thereby, the mobile terminal device 100 is configured to be able to display an image on the integrated display unit when the folding state detection unit 409 has detected that the mobile terminal device 100 is in an unfolded state. Also, the mobile terminal device 100 is configured to be able to display the image on the display part 108 constituting the first display part 402 and display the processed image on the display part 107 constituting the second display part 403 when the folding state detection unit 409 has detected that the mobile terminal device 100 is in a folded state. The mobile terminal device 100 is configured as described above.

<Operation of Mobile Terminal Device>

The mobile terminal device 100 according to the first embodiment is configured as described above, and the operation of the mobile terminal device 100 will be described below.

Figure 7:
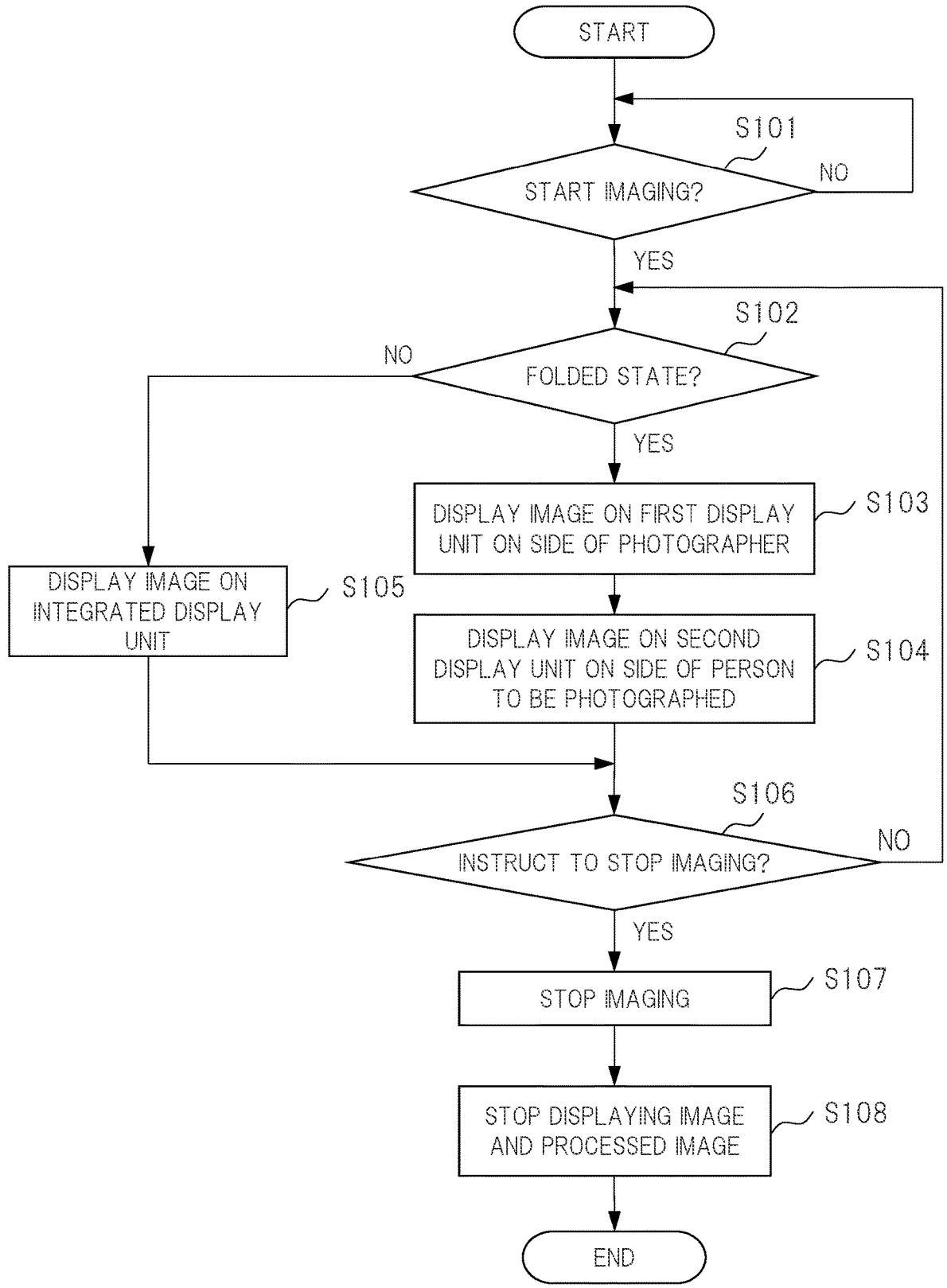
FIG. 7 is a flowchart for describing an operation in the first embodiment.

FIG. 7 is a flowchart for describing the operation of the mobile terminal device.

In FIG. 7, when the camera operation switch 105 is pressed by the photographer and the camera 101 starts imaging surrounding people and scenery (S101), the folding state detection unit 409 detects whether or not the mobile terminal device 100 is in a folded state (S102).

When the folding state detection unit 409 has detected that the mobile terminal device 100 is in the folded state, the image is displayed as a normal image on the first display part 402 (display part 108) on the side of the photographer (S103). On the other hand, the processed image (mirror image) generated by performing image processing on the image by the image processing unit 410 is displayed on the second display part 403 (display part 107) on the side of the person to be photographed (S104).

In this state, it is determined whether an instruction to stop the image display without continuing it is made by the setting input on the touch panel 209 by the touch operation of the photographer or the pressing of the camera operation switch 105 by the photographer (S106). When the stop of photographing has been instructed, the photographing is stopped (S107), the display of the image on the display part 108 on the side of the photographer and the display of the processed image on the display part 107 on the side of the person to be photographed are stopped (S108), and the sequence ends.

On the other hand, when the stop of photographing is not instructed (S106), the sequence returns to the determination S102 as to whether or not the mobile terminal device 100 is folded.

When the folding state detection unit 409 has detected that the mobile terminal device 100 is not in the folded state but is in an open state (S102), the image is displayed as a normal image on the entire display 106 (integrated display unit) (S105). Namely, the image is displayed on a display area including the display part 108 on the side of the photographer which always displays, the display part 107 on the side of the person to be photographed which displays when folded, and the non-display part 109 at the folding portion which does not display when folded.

Then, the sequence proceeds to S106, and the subsequent operation is the same as that described above.

In this manner, when the imaging is started in the state where the mobile terminal device 100 is folded, the figure of the person to be photographed is displayed on the display part 107 on the side of the person to be photographed. As a result, the person to be photographed can see the figure of himself or herself on the display part 107 on the side of the person to be photographed, so that the person to be photographed can visually check how he or she appears in the image during imaging.

In addition, it is possible to change the state of the mobile terminal device 100 from the folded state to the unfolded state or from the unfolded state to the folded state while continuing the imaging. For example, even in such a case where the photographer turns on the camera operation switch 105 in the state where the mobile terminal device 100 is folded, but the photographer wants to check the image on the large screen before imaging with the camera 101, the photographer can unfold and open the mobile terminal device 100. Furthermore, even in the case of imaging with the camera 101 in the state where the mobile terminal device 100 is folded, the photographer can check the image on the large screen by temporarily opening the mobile terminal device 100 without stopping the imaging operation.

Second Embodiment

In the second embodiment, an example in which display/non-display of the processed image on the display part on the side of the person to be photographed is controlled by detecting the line of sight of the person to be photographed will be described.

<Overview of Display Control Based on Line of Sight Detection>

In the second embodiment, when the photographer operates the camera operation switch 105 to start imaging with the camera 101 in the state where the mobile terminal device 100 is folded, the image captured by the camera 101 is displayed on the display part 108 on the side of the photographer. On the other hand, the display part 107 on the side of the person to be photographed remains in the non-display state.

The depth sensor 102 detects the person to be photographed as a person while the person is being photographed by the camera 101, and identifies the left eye and the right eye from the face thereof.

The first left-eye line of sight detector 103a and the first right-eye line of sight detector 104a capture the movements and orientations of the left and right eyes, respectively, identified by the depth sensor 102, and detect the line of sight destination 114 (see FIG. 3) of the person to be photographed.

The mobile terminal device 100 displays the mirror image 115 on the display part 107 when detecting that the line of sight destination 114 detected by the first left-eye line of sight detector 103a and the first right-eye line of sight detector 104a is directed to the display part 107 on the side of the person to be photographed, the camera 101, or at least the mobile terminal device 100 itself.

In this way, only when the mobile terminal device 100 is in the folded state and the person to be photographed is gazing at the mobile terminal device 100 during imaging, the figure of the person to be photographed can be displayed on the display part 107 on the side of the person to be photographed with the mirror image 115 that is easy to see from the person to be photographed.

Therefore, unnecessary display when the person to be photographed is not looking at the mobile terminal device 100 can be suppressed. As a result, the person to be photographed can easily and conveniently visually check how he or she appears in the image during imaging without wasting power consumption.

Note that even when the person to be photographed is detected as a person by the depth sensor 102, the person to be photographed may not be looking at the mobile terminal device 100 if the left and right eyes in the face thereof cannot be found and identified. In this case, the display part 107 on the side of the person to be photographed remains in the off state or the non-display state so as to avoid the unnecessary display.

Also, when the line of sight destination 114 detected by the first left-eye line of sight detector 103a and the first right-eye line of sight detector 104a is not directed to the display part 107 on the side of the person to be photographed, the camera 101, or at least the mobile terminal device 100 itself, similarly, the display part 107 on the side of the person to be photographed remains in the off state or the non-display state so as to avoid the unnecessary display.

In the second embodiment, the case where the depth sensor 102 is used as a component to realize the function of identifying both eyes from the detected human face has been described, but other components may be used.

For example, the left eye and the right eye may be detected by identifying a person or a face from an image of the person to be photographed captured by the camera 101 by the use of an image recognition algorithm for a person or face. Furthermore, in this case, by capturing the eye from the image also with the line of sight detector and detecting the line of sight based on the position of the iris with respect to the inner corner of the eye, the detection by the depth sensor 102 and the line of sight detector can all be processed by image software. Alternatively, the left eye and right eye may be directly detected by the left-eye line of sight detector 103a and the right-eye line of sight detector 104a themselves.

<Functional Block Configuration>

Next, the functional block configuration for realizing the display control based on the line of sight detection will be described with reference to FIG. 6.

In order to realize the display control based on the line of sight detection, the mobile terminal device 100 includes a line of sight direction detection unit 404, a determination unit 407, and a display control unit 408.

The line of sight direction detection unit 404 is configured to detect the line of sight direction of the person to be photographed, and includes, for example, an identification unit 405 configured to identify the eyes of the person to be photographed and a line of sight direction detector 406 configured to detect the line of sight direction of the person to be photographed based on the eye movement identified by the identification unit 405. In particular, the identification unit 405 includes the depth sensor 102 configured to stereoscopically capture the shape, and the identification unit 405 is configured to identify the eyes of the person to be photographed based on the output of the depth sensor 102.

Here, the depth sensor 102 constituting the identification unit 405 detects the person to be photographed as a person in the state where the person is being photographed by the camera 101, and identifies the left eye and the right eye from the face thereof. However, the depth sensor 102 does not need to identify both left and right eyes, and may be configured to detect one of the left and right eyes.

The line of sight direction detector 406 is composed of, for example, the first left-eye line of sight detector 103a and the first right-eye line of sight detector 104a, and these first left-eye line of sight detector 103a and first right-eye line of sight detector 104a are configured to capture the movements and orientations of the left and right eyes identified by the depth sensor 102, respectively, and detect the line of sight destination 114 (see FIG. 3) of the person to be photographed.

However, the line of sight direction detector 406 does not need to be composed of both the first left-eye line of sight detector 103a and the first right-eye line of sight detector 104a, and may be composed of either one of the first left-eye line of sight detector 103a and the first right-eye line of sight detector 104a.

Namely, the identification unit 405 which is a component of the line of sight direction detection unit 404 only needs to be configured to identify the eye (or eyes) of the person to be photographed, and the line of sight direction detector 406 which is a component of the line of sight direction detection unit 404 only needs to be configured to detect the line of sight direction of the person to be photographed based on the movement of the eye (or eyes) identified by the identification unit 405.

In this way, other than the case where the line of sight direction detection unit 404 is configured by hardware, the line of sight direction detection unit 404 may be configured to detect the line of sight direction of the person to be photographed from the image by software by analyzing the image captured by the camera 101 through image processing by the image processing unit 410.

Next, the determination unit 407 is configured to determine whether or not the person to be photographed is facing the presence direction of the mobile terminal device 100 based on the detection result of the line of sight direction detection unit 404 described above. For example, the determination unit 407 is configured to determine whether or not the line of sight direction of the person to be photographed detected by the line of sight direction detection unit 404 is the direction toward the display part 107 on the side of the person to be photographed, the camera 101, or at least the mobile terminal device 100 itself. Further, the determination unit 407 is configured to output, to the display control unit 408, the determination result as to whether or not the person to be photographed faces the presence direction of the mobile terminal device 100.

Next, the display control unit 408 is configured to control display/non-display of the processed image (mirror image) on the display part 107 on the side of the person to be photographed based on the determination result of the determination unit 407. For example, when the determination unit 407 has determined that the person to be photographed faces the presence direction of the mobile terminal device 100, the display control unit 408 displays the processed image on the display part 107 on the side of the person to be photographed. On the other hand, when the determination unit 407 has determined that the person to be photographed is not facing the presence direction of the mobile terminal device 100, the display control unit 408 does not display the processed image.

The mobile terminal device 100 is configured as described above.

<Operation of Mobile Terminal Device>

The mobile terminal device 100 according to the second embodiment is configured as described above, and the operation of the mobile terminal device 100 will be described below.

Figure 8:
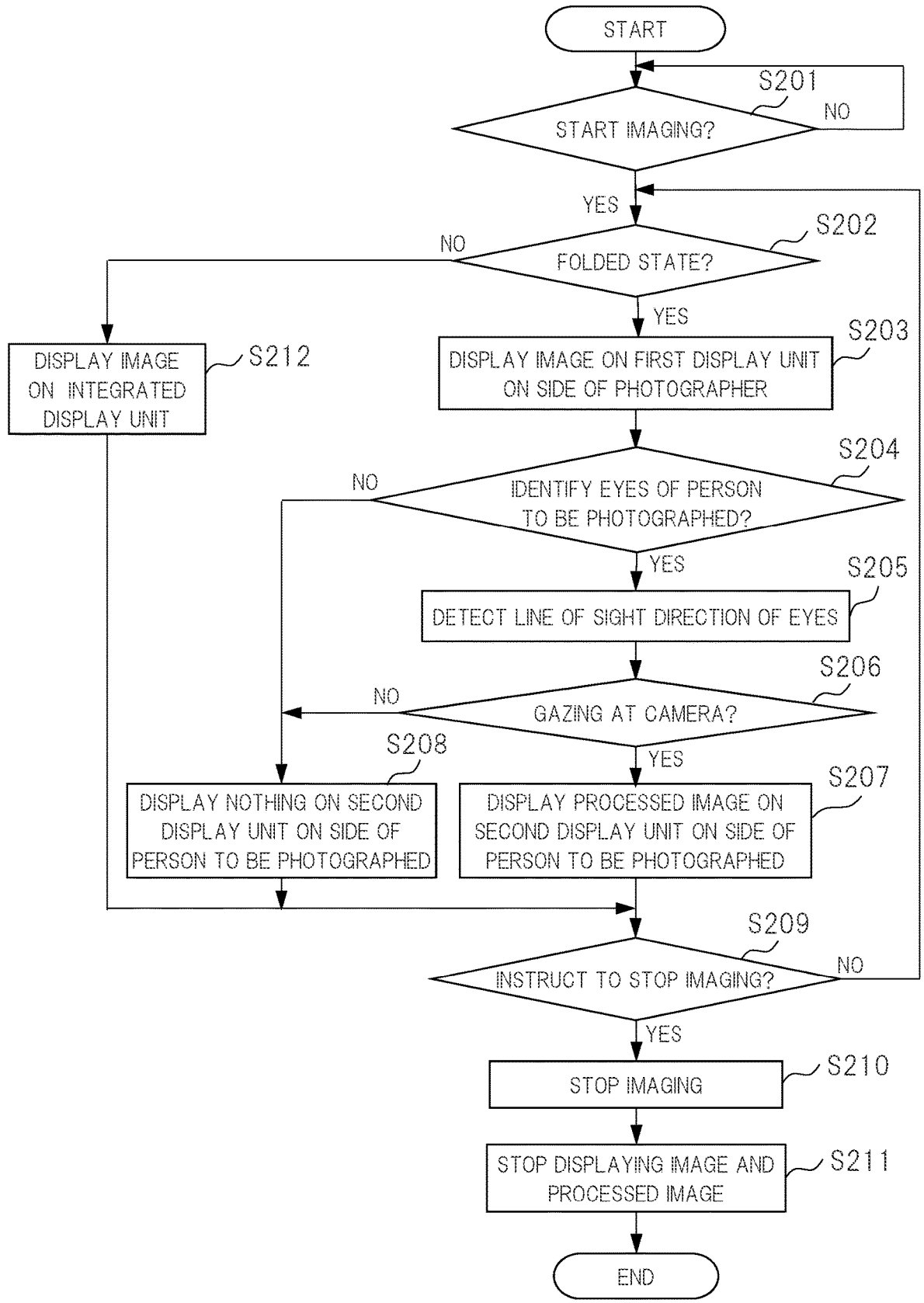
FIG. 8 is a flowchart for describing an operation in the second embodiment.

FIG. 8 is a flowchart for describing the operation of the mobile terminal device.

When the camera operation switch 105 is pressed by the photographer and the camera 101 starts photographing surrounding people and scenery (S201), the folding state detection unit 409 detects whether or not the mobile terminal device 100 is in a folded state (S202).

When the folding state detection unit 409 has detected that the mobile terminal device 100 is in the folded state, the mobile terminal device 100 displays the image captured by the camera 101 as a normal image on the first display part 402 (display-part 108) on the side of the photographer (S203). As a result, the photographer can check the image being captured as it is on the display part 108 on the side of the photographer.

Subsequently, the depth sensor 102 is used to capture and detect the person to be photographed as a person, and it is attempted to identify the left eye and the right eye in the face thereof (S204). If both eyes can be identified, the line of sight destination 114 (line of sight direction) to which the left eye and the right eye are directed is detected by the use of the first left-eye line of sight detector 103a and the first right-eye line of sight detector 104a or the second left-eye line of sight detector 103b and the second right-eye line of sight detector 104b (S205). Based on the detected line of sight destination 114 of the person to be photographed 130, it is determined whether or not the person to be photographed is gazing at the display part 107 on the side of the person to be photographed, the camera 101, or at least the mobile terminal device 100 itself (S206).

When the person to be photographed is gazing at the display part 107 on the side of the person to be photographed, the camera 101, or at least the mobile terminal device 100 itself, the processed image (mirror image) obtained by performing image processing on the image captured by the camera 101 is displayed on the display part 107 on the side of the person to be photographed (S207). Consequently, the person to be photographed can see the figure of himself or herself with the mirror image on the display part 107 on the side of the person to be photographed by looking at the display part 107 on the side of the person to be photographed, the camera 101, or at least the mobile terminal device 100 itself. As a result, according to the second embodiment, the person to be photographed can easily visually check how he or she appears in the image as if looking in a mirror.

When the eyes of the person to be photographed cannot be identified in S204, or when the person to be photographed does not gaze at the display part 107 on the side of the person to be photographed, the camera 101, or at least the mobile terminal device 100 itself in S206, nothing is displayed on the display part 107 on the side of the person to be photographed (S208). As a result, when the person to be photographed is not looking at the display part on the side of the person to be photographed and there is no need to display the processed image, the wasteful power consumption due to unnecessary display can be suppressed by stopping the display of the processed image.

In this state, it is determined whether an instruction to stop imaging without continuing it is made by the setting input on the touch panel 411 by the touch operation of the photographer or the pressing of the camera operation switch 105 by the photographer (S209). When the stop of imaging is instructed, the imaging is stopped (S210), the display of the image on the display part 108 on the side of the photographer and the display of the processed image on the display part 107 on the side of the person to be photographed are stopped (S211), and the sequence ends. When no instruction to stop imaging is given in S209, the sequence returns to the determination as to whether or not the mobile terminal device 100 is in a folded state.

On the other hand, when the folding state detection unit 409 has detected that the mobile terminal device 100 is not in the folded state but is in an open state, the image captured by the camera 101 is displayed as a normal image on the entire display 106 (integrated display unit) (S212). Namely, the image is displayed on a display area including the display part 108 on the side of the photographer which always displays, the display part 107 on the side of the person to be photographed which displays when folded, and the non-display part 109 at the folding portion which does not display when folded. Thereafter, the sequence proceeds to S209, and the subsequent operations are the same as those described above.

With the above operation, only when the mobile terminal device is in the folded state and the person to be photographed is gazing at the mobile terminal device during imaging, the figure of the person to be photographed captured by the camera 101 can be displayed on the display part 107 on the side of the person to be photographed with the mirror image (processed image) that is easy to see from the person to be photographed. As a result, it is possible to suppress wasteful power consumption by preventing unnecessary display when the person to be photographed is not looking, and the person to be photographed can easily and conveniently visually check how he or she appears in the image during imaging.

Also, in the above description, an example of an image captured by the camera 101, that is, a still image such as a photograph is shown, but the person to be photographed can see himself or herself displayed even in the moving image such as video on the display part on the side of the person to be photographed. In particular, also when performing display control based on line of sight detection, the person to be photographed is displayed on the display part on the side of the person to be photographed only when he or she looks at the camera 101, and can visually check how he or she appears in the image even when he or she is moving.

Third Embodiment

The mobile terminal device 100 according to the third embodiment will be described.

The flexible and foldable display 106 of the mobile terminal device 100 according to the first embodiment has a horizontal folding structure as shown in FIG. 2 and FIG. 3, but the flexible and foldable display 106 of the mobile terminal device 100 according to the third embodiment has a vertical folding structure.

Figure 9:
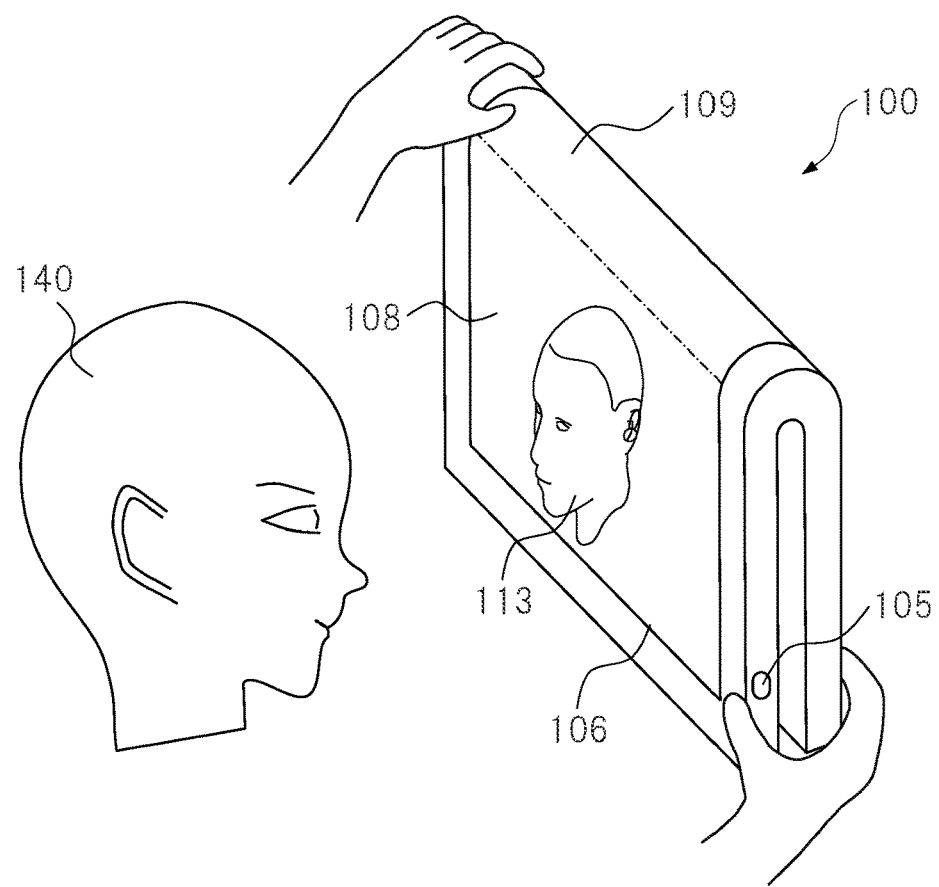
FIG. 9 is a diagram schematically showing a vertical folding mobile terminal device.
Figure 10:
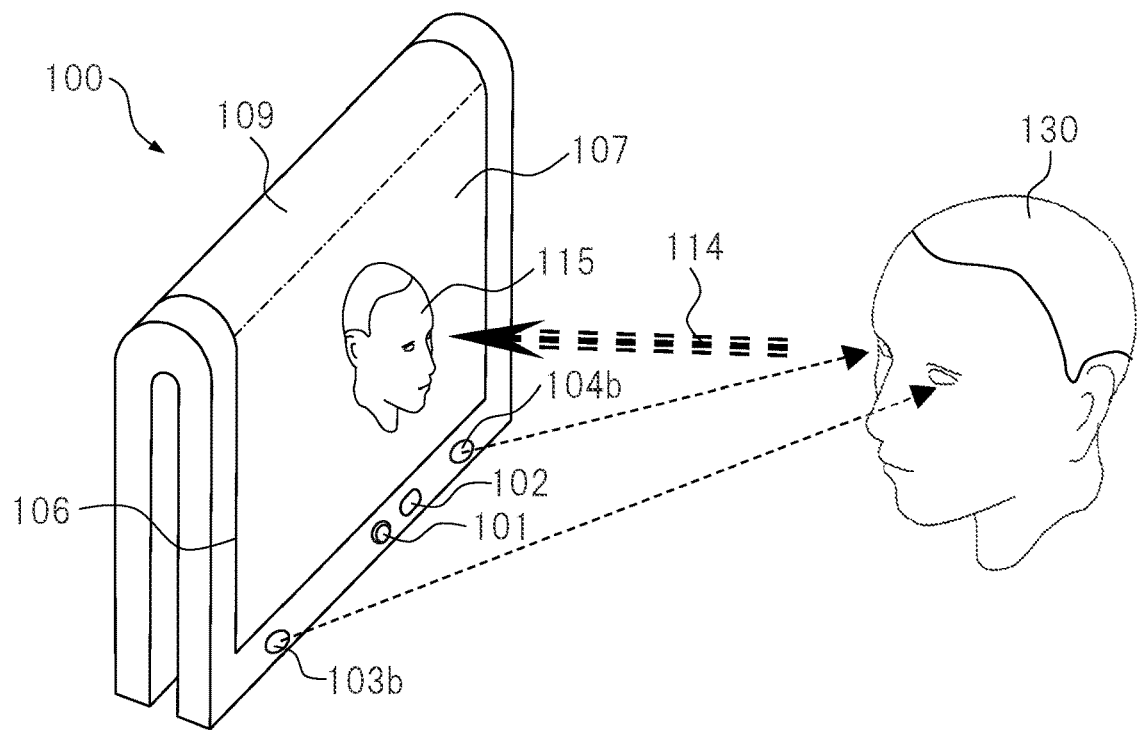
FIG. 10 is a diagram schematically showing the vertical folding mobile terminal device.

FIG. 9 is a diagram showing an overall appearance of the mobile terminal device according to the third embodiment seen from the side of the photographer. FIG. 10 is a diagram showing an overall appearance of the mobile terminal device 100 according to the third embodiment seen from the side of the person to be photographed.

Note that since the components in FIG. 9 denoted by the same reference characters as those in FIG. 2 have the same configurations as those described in FIG. 2, detailed description thereof will be omitted. Similarly, since the components in FIG. 10 denoted by the same reference characters as those in FIG. 3 have the same configurations as those described in FIG. 3, detailed description thereof will be omitted.

The configuration of the third embodiment is different from the configuration of the first embodiment is that a second left-eye line of sight detector 103b and a second right-eye line of sight detector 104b are provided instead of the first left-eye line of sight detector 103a and the first right-eye line of sight detector 104a. The second left-eye line of sight detector 103b and the second right-eye line of sight detector 104b are arranged so as to have the same arrangement direction as that of the left and right eyes of the person to be photographed 130 when captured by the camera 101, as in the case of the arrangement of the first left-eye line of sight detector 103a and the first right-eye line of sight detector 104a shown in FIG. 3.

The control of displaying the processed image (mirror image) obtained by performing image processing on the image captured by the camera 101 on the display part 107 on the side of the person to be photographed when the mobile terminal device 100 is folded is the same as that in the first embodiment described above, and the description thereof will be omitted.

In the display control based on line of sight detection, when the photographer 140 operates the camera operation switch 105 to start imaging with the camera 101 in the state where the mobile terminal device 100 is folded, the image captured by the camera 101 is displayed on the display part 108 on the side of the photographer. On the other hand, the display part 107 on the side of the person to be photographed remains in the non-display state. Then, the depth sensor 102 captures and detects the person to be photographed 130 as a person while the person to be photographed 130 is being captured by the camera 101, and finds and identifies the left eye and the right eye from the face thereof. The second left-eye line of sight detector 103b and the second right-eye line of sight detector 104b capture the movements and orientations of the left and right eyes detected by the depth sensor 102, respectively, and detect the line of sight destination 114 of the person to be photographed 130.

When it has been detected that the line of sight destination 114 detected by the second left-eye line of sight detector 103b and the second right-eye line of sight detector 104b is directed to the display part 107 on the side of the person to be photographed, the camera 101, or at least the mobile terminal device 100 itself, the mobile terminal device 100 displays the mirror image 115 shown like a laterally inverted image in a mirror on the display part 107 on the side of the person to be photographed.

In this way, even when the display 106 of the mobile terminal device 100 has the vertical folding structure, the line of sight of both eyes of the person to be photographed 130 can be detected more accurately, and the figure of the person to be photographed can be displayed on the display part 107 on the side of the person to be photographed with the mirror image 115 that is easy to see from the person to be photographed only when the mobile terminal device 100 is in the folded state and the person to be photographed is gazing at the mobile terminal device 100 during imaging.

Note that even in the case of the mobile terminal device 100 in which the display 106 has the vertical folding structure, the first left-eye line of sight detector 103a and the first right-eye line of sight detector 104a may be used for the line of sight detection instead of the second left-eye line of sight detector 103b and the second right-eye line of sight detector 104b.

Also, in any case where the mobile terminal device 100 has the display part 106 with the horizontal folding structure or the vertical folding structure, a plurality of line of sight detectors such as the first left-eye line of sight detector 103a, the second left-eye line of sight detector 103b, the first right-eye line of sight detector 104a, and the second right-eye line of sight detector 104b may be provided, and optimum line of sight detectors may be selected or used in combination according to the positional relationship between the mobile terminal device 100 and the person to be photographed 130. In this case, regardless of the positional relationship between the mobile terminal device 100 and the person to be photographed 130, more accurate line of sight detection can be performed.

Further, in the case of the mobile terminal device 100 having a pair of the first left-eye line of sight detector 103a and the first right-eye line of sight detector 104a and a pair of the second left-eye line of sight detector 103b and the second right-eye line of sight detector 104b, the posture of the mobile terminal device 100 may be detected, and the pair capable of more accurately detecting the line of sight may be selected according to the posture. The posture of the mobile terminal device 100 can be detected by sensors such as the acceleration sensor 202, the gyro sensor 203, and the geomagnetic sensor 204.

Fourth Embodiment

The mobile terminal device 100 according to the fourth embodiment will be described.

Figure 11:
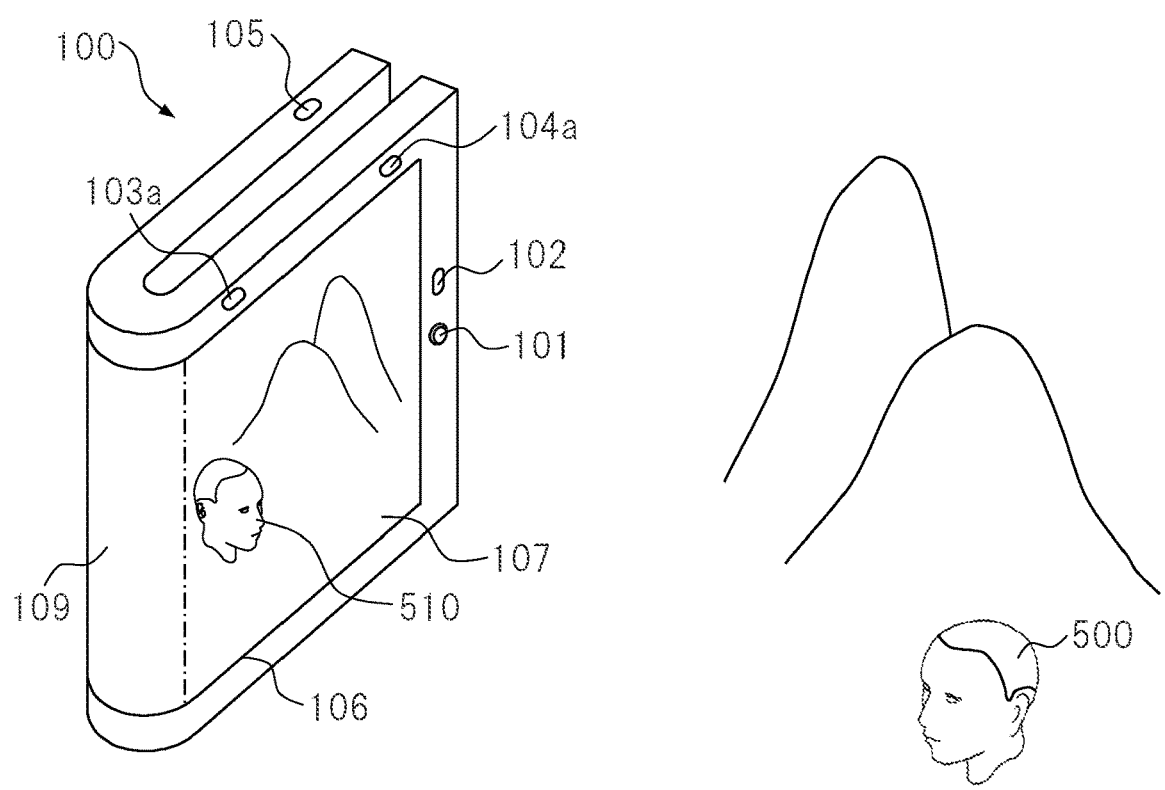
FIG. 11 is a diagram showing a display unit on the side of the person to be photographed.
Figure 12:
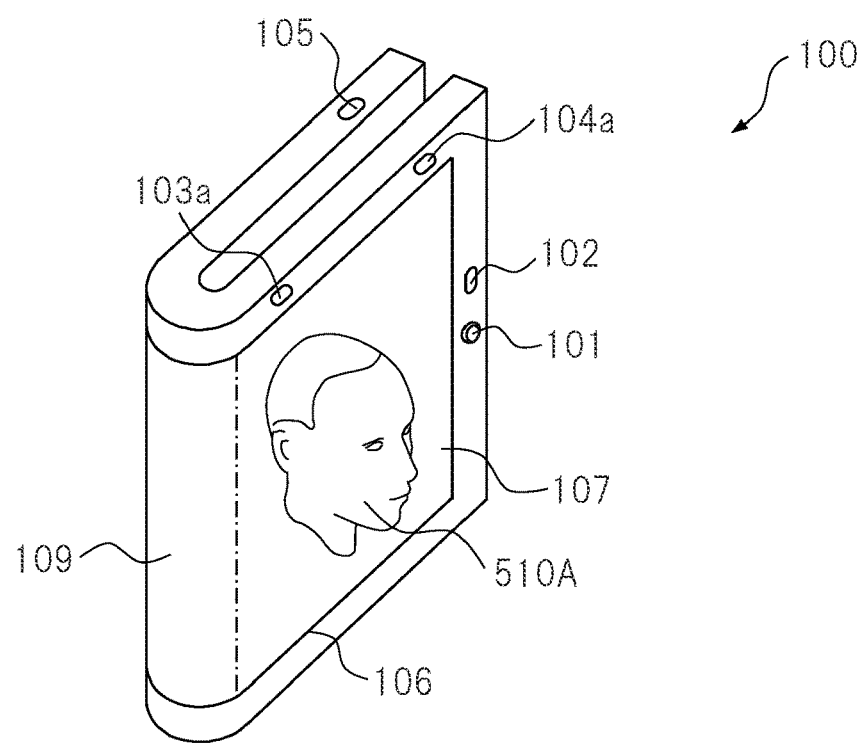
FIG. 12 is a diagram showing a processed image displayed on a display unit on the side of the person to be photographed in an enlarged manner.

FIG. 11 is a diagram schematically showing an overall appearance of the mobile terminal device when the person to be photographed is photographed small in the image captured by the camera. FIG. 12 is a diagram showing the display part on the side of the person to be photographed in the case of FIG. 11. Note that since the components in FIG. 11 and FIG. 12 denoted by the same reference characters as those in the first embodiment have the same configurations as those described in the first embodiment, detailed description thereof will be omitted.

As shown in FIG. 11, when a person to be photographed 500 appears far away within the imaging range of the camera 101 or when the whole scenery is to be photographed, the person to be photographed 500 is displayed as a mirror image 510 that is relatively small in the image if the image captured by the camera 101 is displayed as it is on the display part 107 on the side of the person to be photographed. In this case, it is difficult for the person to be photographed 500 to easily visually check how he or she appears in the image even when looking at the display part 107 on the side of the person to be photographed.

Therefore, in the mobile terminal device 100 according to the fourth embodiment, the functions described below are provided to address the above-described difficulty.

As shown in FIG. 6, the mobile terminal device 100 according to the fourth embodiment includes the image processing unit 410 configured to perform image processing on the image captured by the camera 101. The image processing unit 410 is configured to expand the image region of the person to be photographed 500 included in the image captured by the camera 101 and to generate a processed image subjected to mirror image processing. Further, the second display part 403 is configured to display the processed image generated by the image processing unit 410.

Thereby, in the mobile terminal device 100 according to the fourth embodiment, as shown in FIG. 12, a processed image (mirror image) 510A in which the person to be photographed 500 is enlarged is displayed on the display part 107 on the side of the person to be photographed. For example, the mobile terminal device 100 temporarily stores the image captured by the camera 101 in the information data 207 in the memory 208, the image processing unit 410 reads the image centering on the person to be photographed 510 from the stored image, and the enlarged processed image 510A is displayed on the display part 107 on the side of the person to be photographed.

Figure 13:
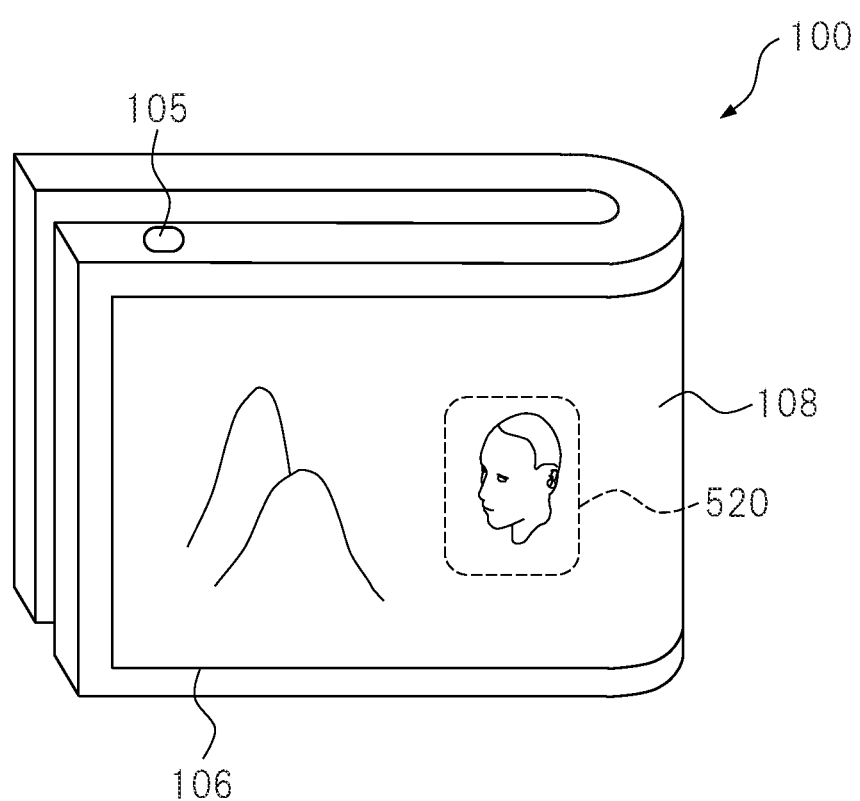
FIG. 13 is a diagram showing a display unit on the side of the photographer.

Further, as shown in FIG. 13, the entire image is displayed as a normal image on the display part 108 on the side of the photographer. At this time, it is also possible to display a frame 520 such that the display range showing the figure of the person to be photographed can be seen. By displaying the frame 520, the person to be photographed 500 to be displayed in an enlarged manner on the display part 107 on the side of the person to be photographed can be identified.

As described above, with the mobile terminal device 100 according to the fourth embodiment, the person to be photographed 500 can see the figure of himself or herself displayed in an enlarged manner on the display part 107 on the side of the person to be photographed, which makes it possible to easily visually check how he or she appears in the image reliably during imaging.

Fifth Embodiment

The mobile terminal device 100 according to the fifth embodiment will be described.

Figure 14:
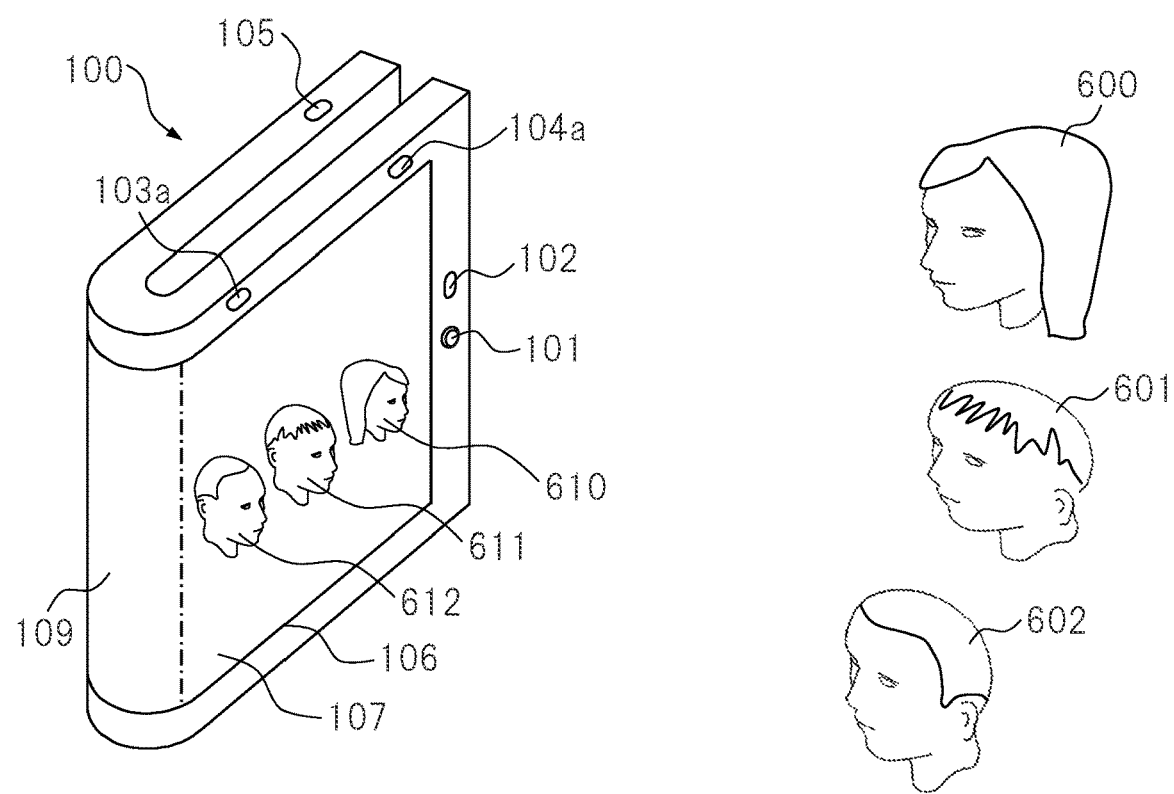
FIG. 14 is a diagram showing the display unit on the side of the person to be photographed.
Figure 15:
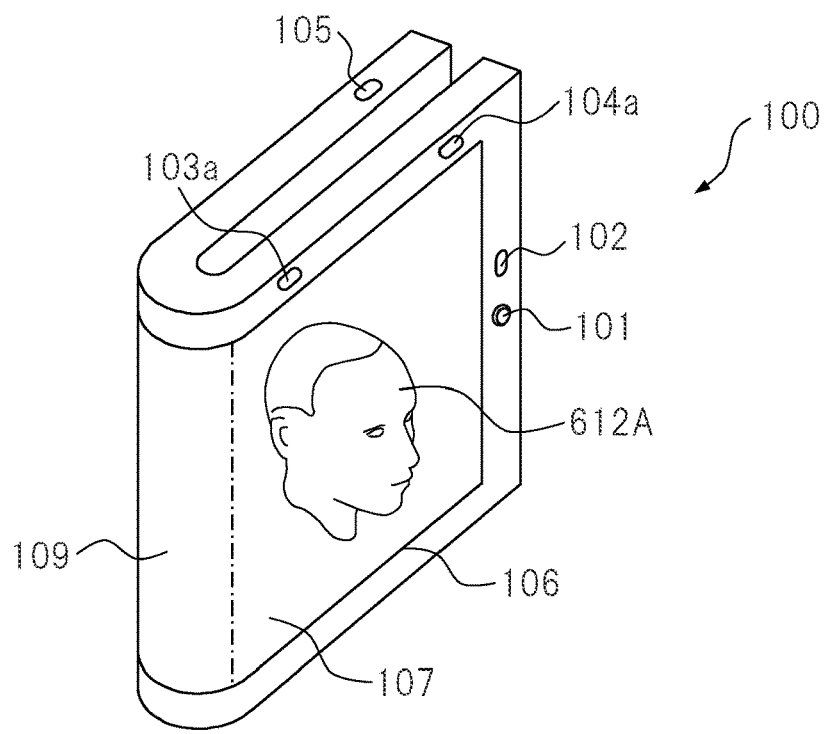
FIG. 15 is a diagram showing a part of the processed image on the side of the person to be photographed in an enlarged manner.
Figure 16:
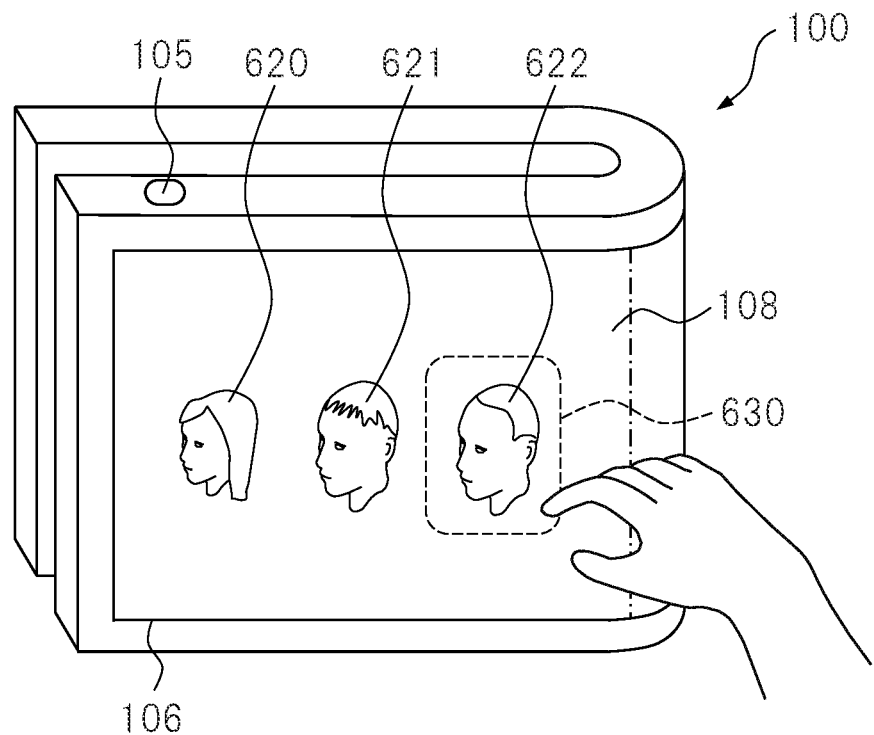
FIG. 16 is a diagram showing the display unit on the side of the photographer.
Figure 17:
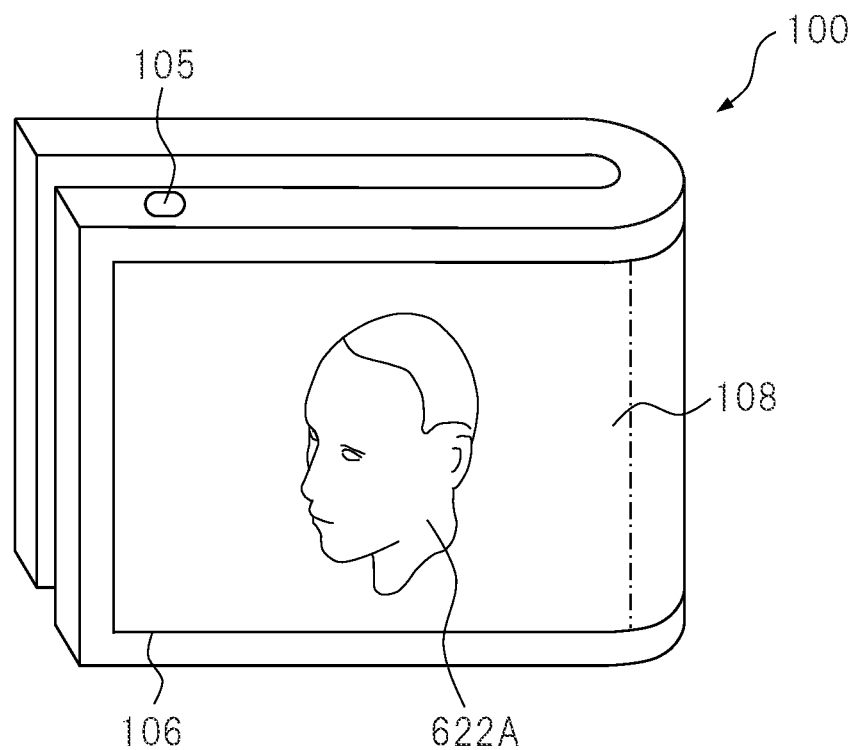
FIG. 17 is a diagram showing a part of the person to be photographed on the display unit on the side of the photographer.

FIG. 14 and FIG. 15 are diagrams schematically showing an overall appearance of the mobile terminal device when there are a plurality of persons to be photographed in the image captured by the camera. FIG. 16 and FIG. 17 are diagrams showing the display part on the side of the photographer in the case of FIG. 14.

Note that since the components in FIG. 14 to FIG. 17 denoted by the same reference characters as those in the first embodiment have the same configurations as those described in the first embodiment, detailed description thereof will be omitted.

The mobile terminal device 100 according to the fifth embodiment has the following functions. That is, in FIG. 6, the mobile terminal device 100 has the image processing unit 410 and the input operation unit 411. The input operation unit 411 is configured so as to be able to specify a partial image region in which a specific person to be photographed is captured in the image region of the image in which the plurality of persons to be photographed are captured. For example, the input operation unit 411 is composed of a first touch panel unit 412 which is on the first display part 402 and is configured to be able to specify the partial image region from the image region of the image based on the position touched by the photographer. Further, the image processing unit 410 is configured to generate the processed image obtained by expanding the partial image region specified by the input operation unit 411 and performing mirror image processing. Further, the second display part 403 displays the processed image generated by image processing unit 410.

Specific descriptions will be given below.

As shown in FIG. 14, when there are a plurality of persons to be photographed 600, 601, and 602 in the image captured by the camera 101 and this image is displayed as it is on the display part 107 on the side of the person to be photographed, the persons to be photographed 600, 601, and 602 are displayed with relatively small processed images 610, 611, 612 in the image. Therefore, in the fifth embodiment, when the photographer performs an input operation for specifying a person to be photographed who is to be displayed in an enlarged manner as shown in FIG. 16, the processed image 612A in which the specified person to be photographed 602 is displayed in an enlarged manner is displayed on the display part 107 on the side of the person to be photographed as shown in FIG. 15. For the input operation, the touch panel 209 (first touch panel unit 412) can be used. As shown in FIG. 16, the display part 108 on the side of the photographer displays the entire image as a normal image captured by the camera 101. The persons are detected and the plurality of processed images 620, 621, and 622 of the persons to be photographed that are to be enlarged are displayed, and the processed image 622 of the specific person to be photographed is touched and selected on the display part 108. The touch panel 209 detects that the photographer has touched the position of the person to be photographed specified by the photographer on the display part 108 on the side of the photographer on which the plurality of persons to be photographed are displayed, the mobile terminal device 100 takes in the person to be photographed at the position detected on the touch panel 209 as input information, and displays the processed image 612A of the specified person to be photographed in an enlarged manner on the display part 107 on the side of the person to be photographed as shown in FIG. 15.

Further, as shown in FIG. 16, a frame 630 for selection may be displayed around the person to be photographed who is to be enlarged. At that time, the line of sight of the person to be photographed within the frame 630 is detected by the line of sight detector, and the processed image of the person to be photographed within the frame 630 is displayed in an enlarged manner on the display part 107 on the side of the person to be photographed only when the line of sight destination (line of sight direction) of the person to be photographed is directed to the display part 107 on the side of the person to be photographed, the camera 101, or at least the mobile terminal device 100 itself. It is meaningless to display the person to be photographed who is not looking at the camera 101, and only the person to be photographed who is looking at the camera 101 can be displayed in an enlarged manner such that he or she can visually check how he or she appears in the image. Namely, it is possible to assist the photographer in selection by the "frame display" and the "function of determining the target of the frame display" such as the line of sight detection.

Further, after the person to be photographed to be displayed in an enlarged manner is specified by the input operation, the selected image of the specified person to be photographed may be displayed also on the display part 108 on the side of the photographer with an enlarged image 622A as shown in FIG. 17. This display enables the photographer to reliably visually confirm that the selected and specified person to be photographed is definitely displayed in an enlarged manner after the selection and specification.

As described above, when there are a plurality of persons to be photographed, the photographer can specify the person to be photographed to be displayed in an enlarged manner on the display part 107 on the side of the person to be photographed. Accordingly, the photographer can specify the person to be photographed who wants to visually check how he or she appears in the image most, and can provide the specified person to be photographed with a processed image that is displayed in an enlarged manner for easy viewing. Conversely, in response to a request from the person to be photographed who wants to visually check how he or she appears in the image most, the photographer can display the requested person to be photographed in an enlarged manner.

As another example of a specific input operation, the microphone 210 may be used as an input operation unit for performing the input operation, and the voice from the photographer indicating the specific person to be photographed may be taken into the mobile terminal device 100 with the microphone 210. Furthermore, it is also possible to determine the specific person to be photographed by providing a line of sight detector to detect the line of sight of the photographer on the side of the photographer and detecting which person to be photographed the photographer is to specify among the plurality of persons to be photographed displayed on the display part on the side of the photographer by the line of sight detector on the side of the photographer. Also, the photographer may ask the person to be photographed whether or not to display the image. For example, it is not necessary to display the image when a person who happens to be in the image is looking at the camera 101.

Sixth Embodiment

The mobile terminal device 100 according to the sixth embodiment will be described.

Figure 18:
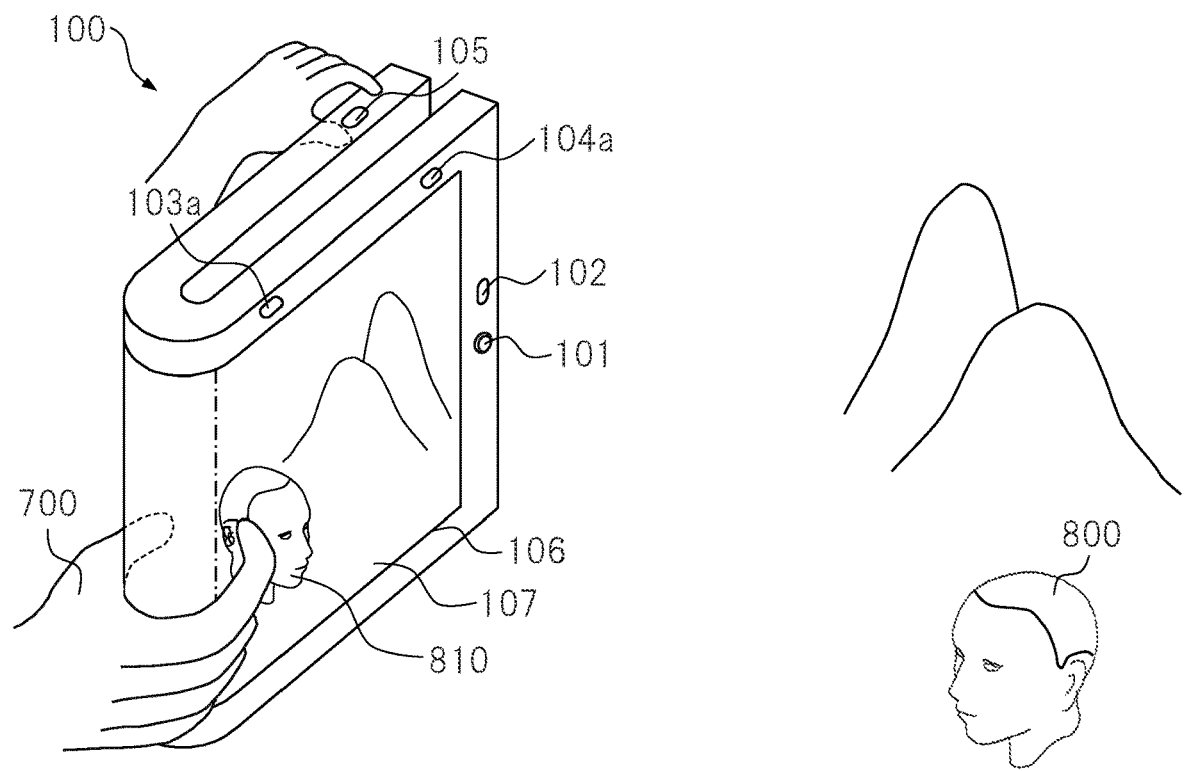
FIG. 18 is a diagram showing the display unit on the side of the person to be photographed.
Figure 19:
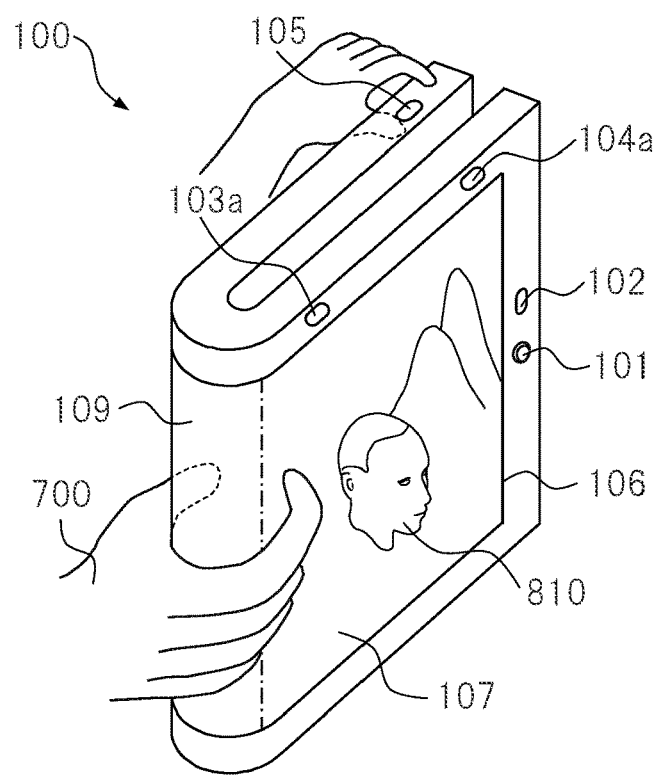
FIG. 19 is a diagram showing the display unit on the side of the person to be photographed.
Figure 20A:
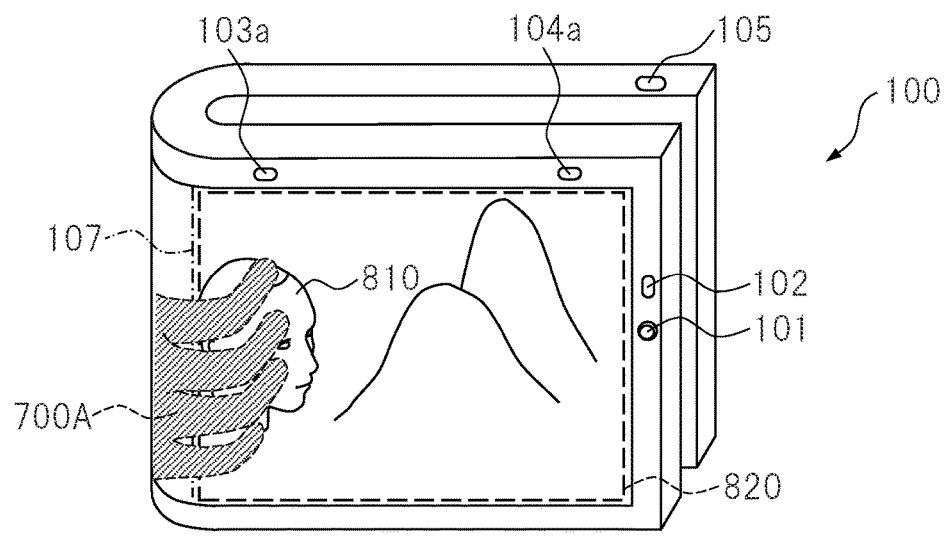
FIG. 20A-20C are diagrams for describing the sixth embodiment.

FIG. 18 is a diagram schematically showing an overall appearance of the mobile terminal device in the case where a holding hand of the photographer covers the person to be photographed displayed on the display unit on the side of the person to be photographed and the person to be photographed cannot see the entire figure of himself or herself. FIG. 19 and FIGS. 20A-20C are diagrams showing the display unit on the side of the person to be photographed in the case shown in FIG. 18. FIG. 21 is a diagram showing the display unit on the side of the photographer in the case shown in FIG. 18. Note that since the components in FIG. 18 to FIG. 21 denoted by the same reference characters as those in the first embodiment have the same configurations as those described in the first embodiment, detailed description thereof will be omitted.

The mobile terminal device 100 according to the sixth embodiment has the following functions. That is, in FIG. 6, the mobile terminal device 100 has the image processing unit 410, the input operation unit 411, and an overlap determination unit 414. The input operation unit 411 includes a second touch panel unit 413 which is on the second display part 403 and is configured to detect an overlapping region between the second display part 403 and the holding hand of the photographer. Also, the overlap determination unit 414 is configured to determine whether the overlapping region detected by the second touch panel unit 413 and the image region of the person to be photographed included in the processed image displayed on the second display part 403 overlap in plan view. Further, when the overlap determination unit 414 has determined that the overlapping region and the image region of the person to be photographed overlap in plan view, the image processing unit 410 performs the image processing on the processed image such that the image region of the person to be photographed does not overlap the overlapping region in plan view. Then, the second display part 403 displays the processed image subjected to the image processing by the image processing unit 410.

Specific descriptions will be given below.

As shown in FIG. 18, when a person to be photographed 800 is within the imaging range of the camera 101 and the processed image displayed on the display part 107 on the side of the person to be photographed includes an image region 810 in which the person to be photographed is shown, a holding hand 700 of the photographer who is holding the mobile terminal device 100 may partially cover and block the image region 810 of the person to be photographed displayed on the display part 107. In this case, it becomes very difficult for the person to be photographed 800 to see himself or herself in the image. Therefore, the mobile terminal device 100 according to the sixth embodiment is configured such that the overlapping region between the display part 107 on the side of the person to be photographed and the holding hand 700 of the photographer is detected by the touch panel 209 (second touch panel unit 413) and the image region 810 of the person to be photographed is moved to a position other than the detected overlapping region and displayed there as shown in FIG. 19.

This configuration will be described in detail with reference to FIGS. 20A-20C. First, as shown in FIG. 20A, a blocked range 700A that is covered and blocked by the holding hand is detected by the touch panel 209. In FIG. 20A, the blocked range 700A covers and blocks the image region 810 in which the person to be photographed is displayed on the display unit 107 on the side of the person to be photographed. Note that a region 820 indicated by the dotted line shows an image display range in which the processed image is displayed on the display unit 107 on the side of the person to be photographed, and the region 820 is almost the entire range of the display unit 107 on the side of the person to be photographed in the case of FIG. 20A.

Figure 20B:
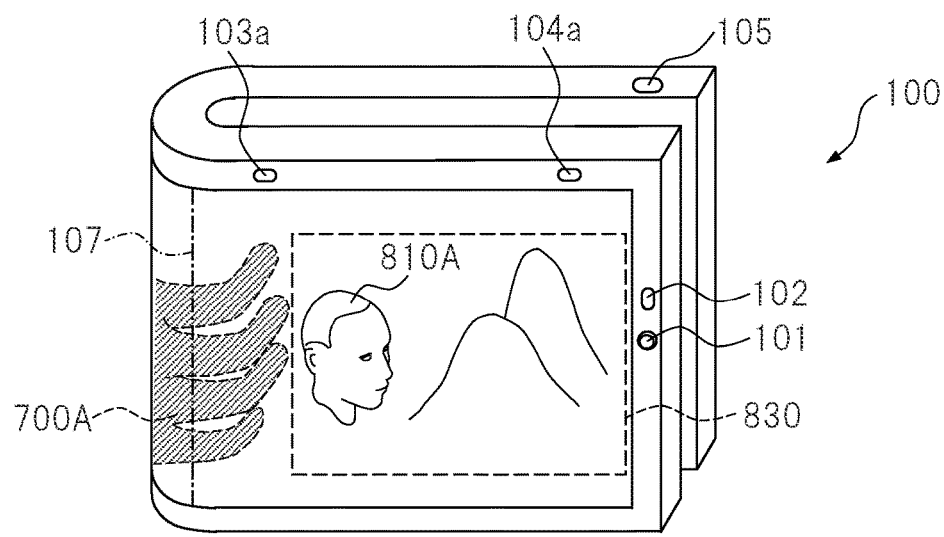
Figure 20C:
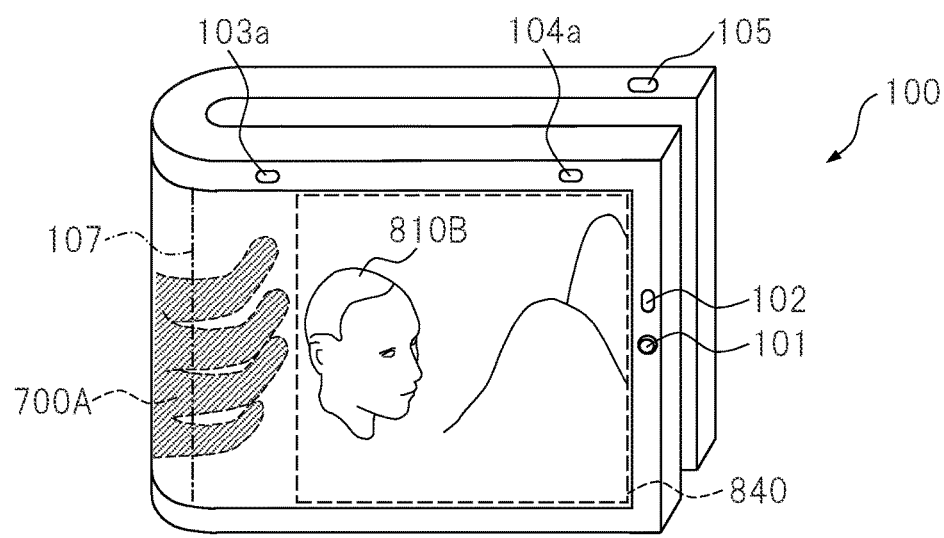
Figure 21:
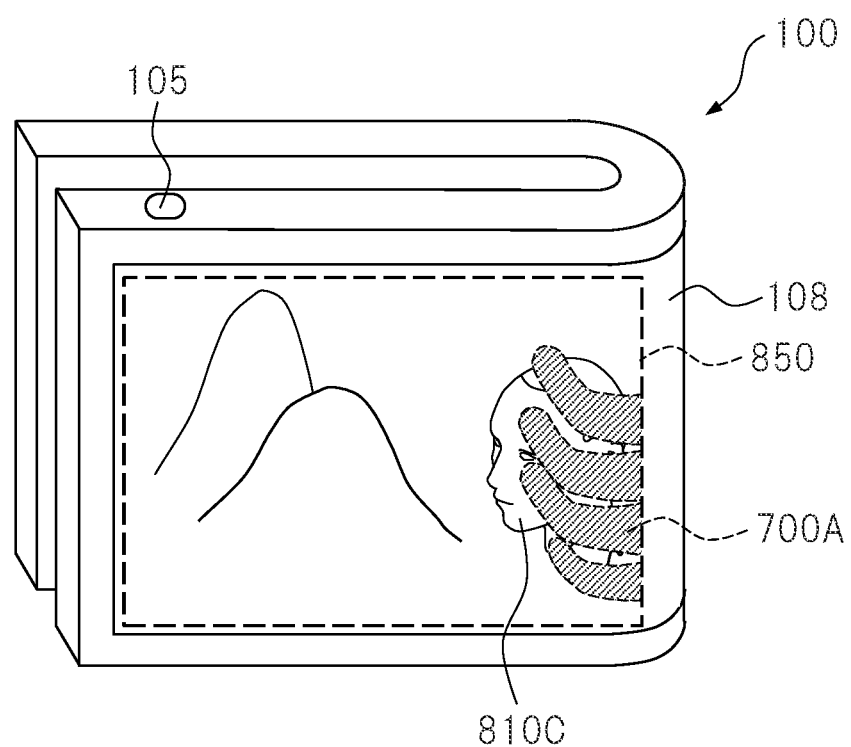
FIG. 21 is a diagram showing the display unit on the side of the photographer.

On the other hand, for example, as shown in FIG. 20B, the entire processed image is reduced, and the reduced entire processed image is displayed in a region 830 other than the blocked range 700A. In this case, by preventing the region 830 and the blocked range 700A from overlapping each other, the image region 810A in which the person to be photographed is shown can be displayed without being hidden by the blocked range 700A while displaying the entire processed image. Further, as shown in FIG. 20C, it is also possible to move the entire processed image and display the moved processed image in a region 840 other than the blocked range 700A detected by the touch panel 209. In this case, although there is an undisplayed part except for an image region 810B in which the person to be photographed is shown, the image region 810B in which the person to be photographed is shown can be displayed in its original size without being blocked by the blocked range 700A. Further, for example, as shown in FIG. 12 of the fourth embodiment, it is also possible to display the processed image of the person to be photographed in an enlarged manner outside the blocked range 700A so as not to be blocked by the holding hand.

Furthermore, as shown in FIG. 21, the blocked range 700A by the holding hand may be displayed on the display part 108 on the side of the photographer. Thereby, since the photographer can recognize the state in which an image region 810C in which the person to be photographed is shown in an image display region 850 indicated by the dotted line is covered with the blocked range 700A by the holding hand, it is possible to select and instruct how to display the image region 810C in which the person to be photographed is shown outside the blocked range 700A by the holding hand according to the recognized state. As a result, with the mobile terminal device 100 according to the sixth embodiment, the person to be photographed can reliably visually check the entire figure of himself or herself without being blocked by the holding hand.

Seventh Embodiment

The mobile terminal device 100 according to the seventh embodiment will be described.

In the seventh embodiment, an example in which the camera 101 and the depth sensor 102 are arranged on the inner surface of the mobile terminal device 100 in the folded state will be described.

Figure 22:
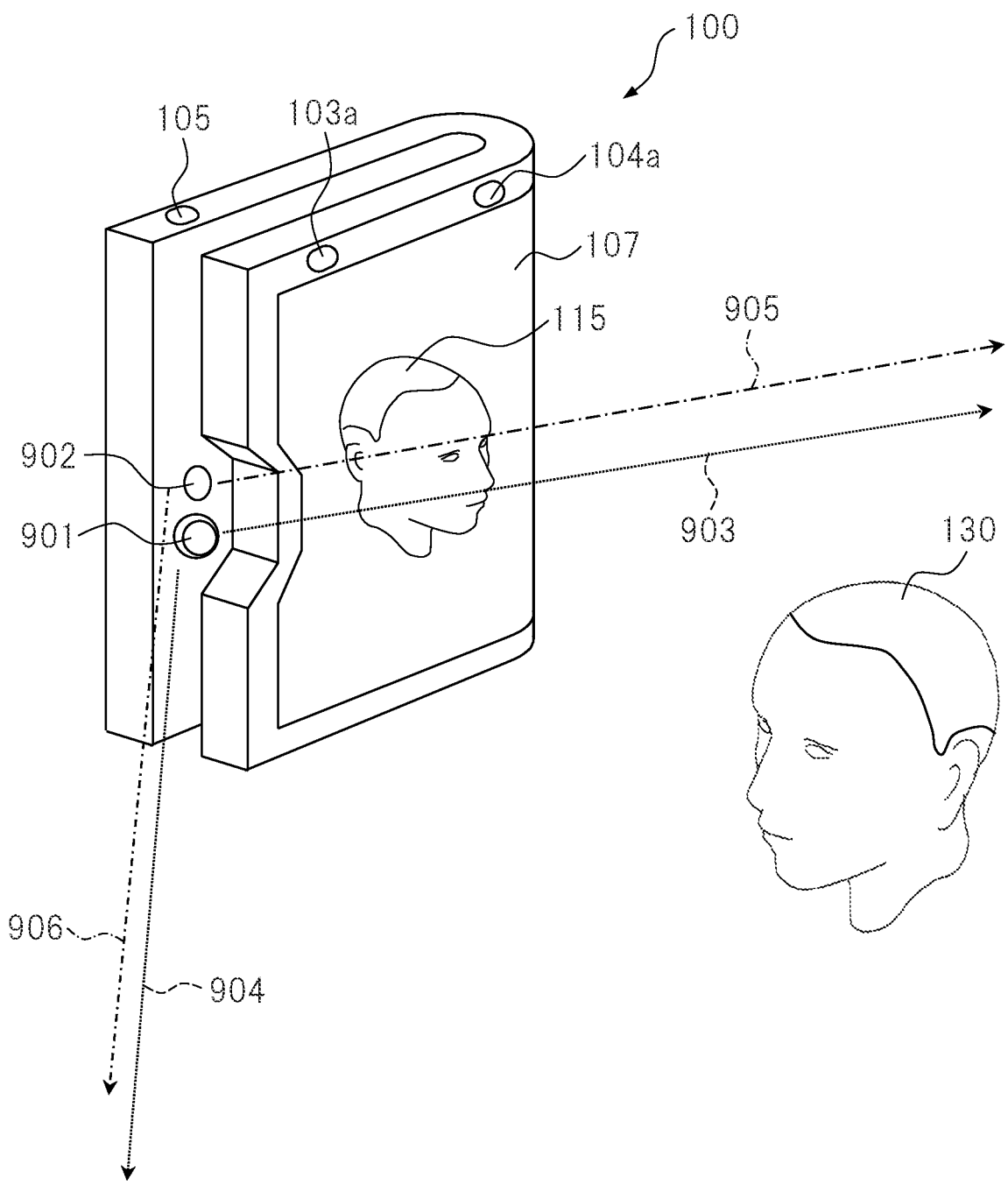
FIG. 22 is a diagram for describing the seventh embodiment.

Note that since the components in FIG. 22 denoted by the same reference characters as those in the first embodiment have the same configurations as those described in the first embodiment, detailed description thereof will be omitted.

For example, in the first embodiment, an example in which the camera 101 and the depth sensor 102 are arranged on the outer surface of the mobile terminal device 100 in the folded state has been described. In this case, for example, as shown in FIG. 3, the forward field of view of the camera 101 and the depth sensor 102 is not blocked, and there is no case where the camera 101 and the depth sensor 102 cannot sufficiently perform photographing, detection, and identification of the person to be photographed 130. Namely, in the configuration of the mobile terminal device 100 according to the first embodiment, the camera 101 (imaging unit 401) is provided at the position where it can image the person to be photographed 130 even when the mobile terminal device 100 is folded, and the line of sight direction detection unit 404 is also provided at the position where it can detect the line of sight direction of the person to be photographed 130.

On the other hand, for example, when the camera 101 and the depth sensor 102 are arranged on the inner surface of the mobile terminal device 100 in the folded state, the forward field of view of the camera 101 and the depth sensor 102 is blocked depending on the housing structure of the mobile terminal device 100 in the folded state, and photographing, detection, and identification of the person to be photographed 130 by the camera 101 and the depth sensor 102 cannot be sufficiently performed in some cases.

In this respect, in the seventh embodiment, the mobile terminal device 100 has the housing structure as follows. That is, as shown in FIG. 22, an opening or the like is formed in the housing in front of a camera 901 and a depth sensor 902 on the inner surface of the folded mobile terminal device 100 such that the imaging range of the camera 901 between a direction 903 and a direction 904 and the measuring range of the depth sensor 902 between a direction 905 and a direction 906 are not blocked even in the folded state.

In other words, the mobile terminal device 100 according to the seventh embodiment has the housing structure in which the imaging by the imaging unit 401 and the detection of the line of sight direction by the line of sight direction detection unit 404 are not hindered even when the mobile terminal device 100 is folded.

As a result, with the mobile terminal device 100 according to the seventh embodiment, the camera 901 can satisfactorily photograph all the persons and sceneries within the field of view and the depth sensor 902 can detect the person to be photographed 130 as a person and successfully identify the eyes from the face of the detected person when the mobile terminal device 100 is in the folded state.

Eighth Embodiment

A mobile terminal device 100A according to the eighth embodiment will be described.

Figure 23:
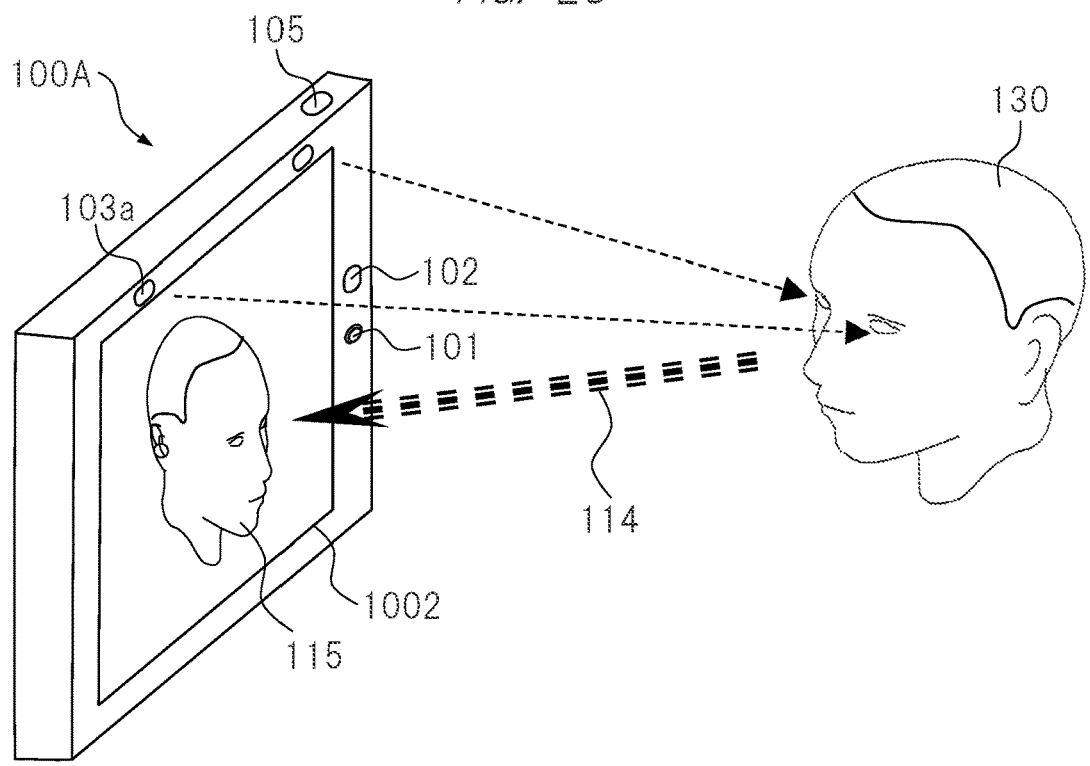
FIG. 23 is a diagram for describing the eighth embodiment.
Figure 24:
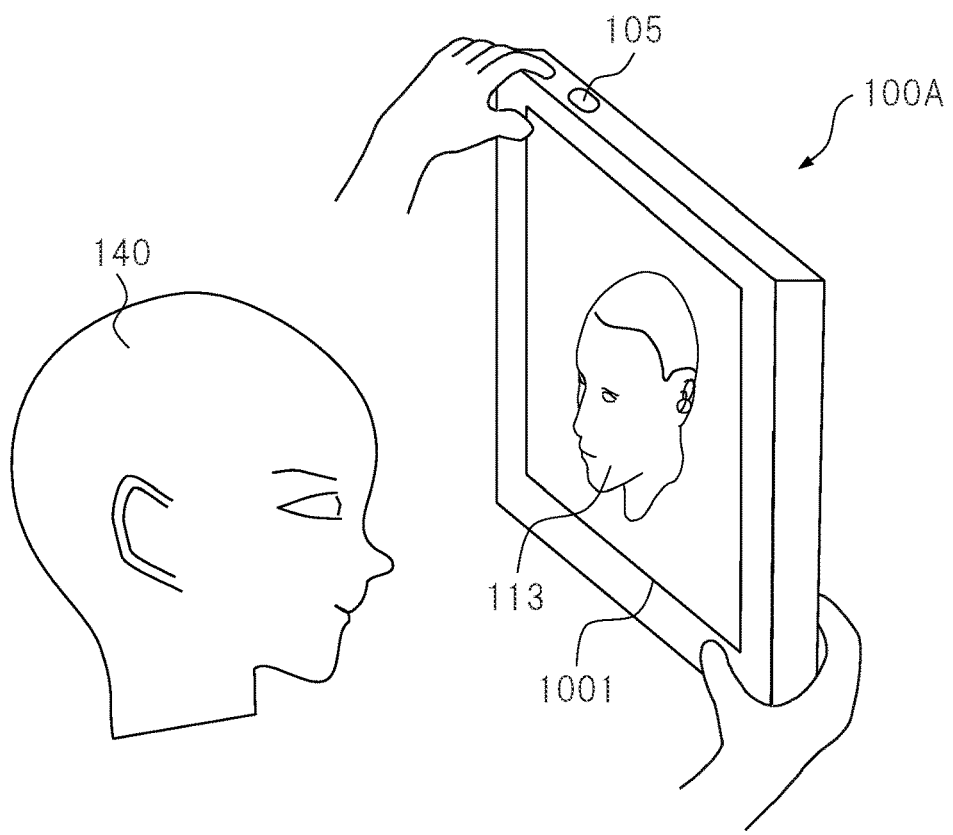
FIG. 24 is a diagram for describing the eighth embodiment.

FIG. 23 is a diagram schematically showing an overall appearance of the mobile terminal device according to the eighth embodiment, and FIG. 24 is a diagram schematically showing the external appearance of the mobile terminal device shown in FIG. 23 from another angle. Note that since the components in FIG. 23 and FIG. 24 denoted by the same reference characters as those in the first embodiment have the same configurations as those described in the first embodiment, detailed description thereof will be omitted.

In the mobile terminal device 100A shown in FIG. 23, an unfoldable flat panel made of a glass substrate is used as a display instead of the flexible display panel adopted in the first embodiment described above. As shown in FIG. 23 and FIG. 24, the mobile terminal device 100A has a main display 1001 on the side of the photographer 140 (see FIG. 24) and a sub-display 1002 on the side of the person to be photographed 130 (see FIG. 23).

In FIG. 24, when the person to be photographed 130 appears within the imaging range of the camera 101, the image 113 of the person to be photographed captured by the camera 101 is displayed as a normal image on the main display 1001 which is the display part on the side of the photographer 140, and the photographer 140 can check the person to be photographed with the image 113. On the other hand, as shown in FIG. 23, when the person to be photographed 130 appears, the left-eye line of sight detector 103a and the first right-eye line of sight detector 104a each capture the movements and orientations of the left and right eyes of the person to be photographed 130 detected and identified by the depth sensor 102. Then, when it has been detected that the line of sight destination 114 of the person to be photographed 130 is directed to the sub-display 1002 which is the display part on the side of the person to be photographed 130, the camera 101, or at least the mobile terminal device 100A itself, the mirror image 115 shown like a laterally inverted image in a mirror is displayed on the sub-display 1002.

Therefore, even in the case of the mobile terminal device 100A according to the eighth embodiment which includes displays on both the front and back surfaces, the figure of the person to be photographed 130 can be displayed on the sub-display 1002 on the side of the person to be photographed 130 with the mirror image 115 that is easy to see from the person to be photographed only when the person to be photographed 130 is gazing at the mobile terminal device 100A during imaging. As a result, it is possible to suppress wasteful power consumption by preventing unnecessary display when the person to be photographed 130 is not looking, and the person to be photographed 130 can easily and conveniently visually check how he or she appears in the image during imaging.

Next, as another example of the eighth embodiment, an example in which a flexible display is provided on an inner surface of a mobile terminal device 100B in the folded state will be described.

Figure 25:
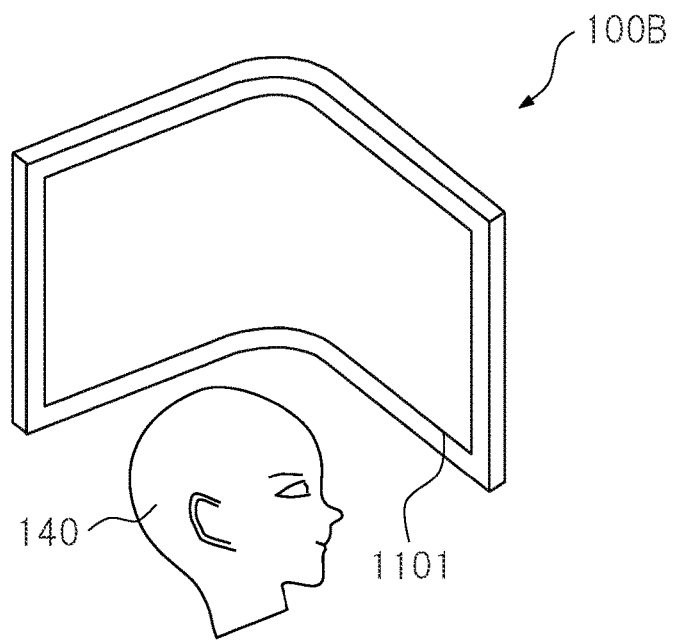
FIG. 25 is a diagram for describing another example of the eighth embodiment.
Figure 26:
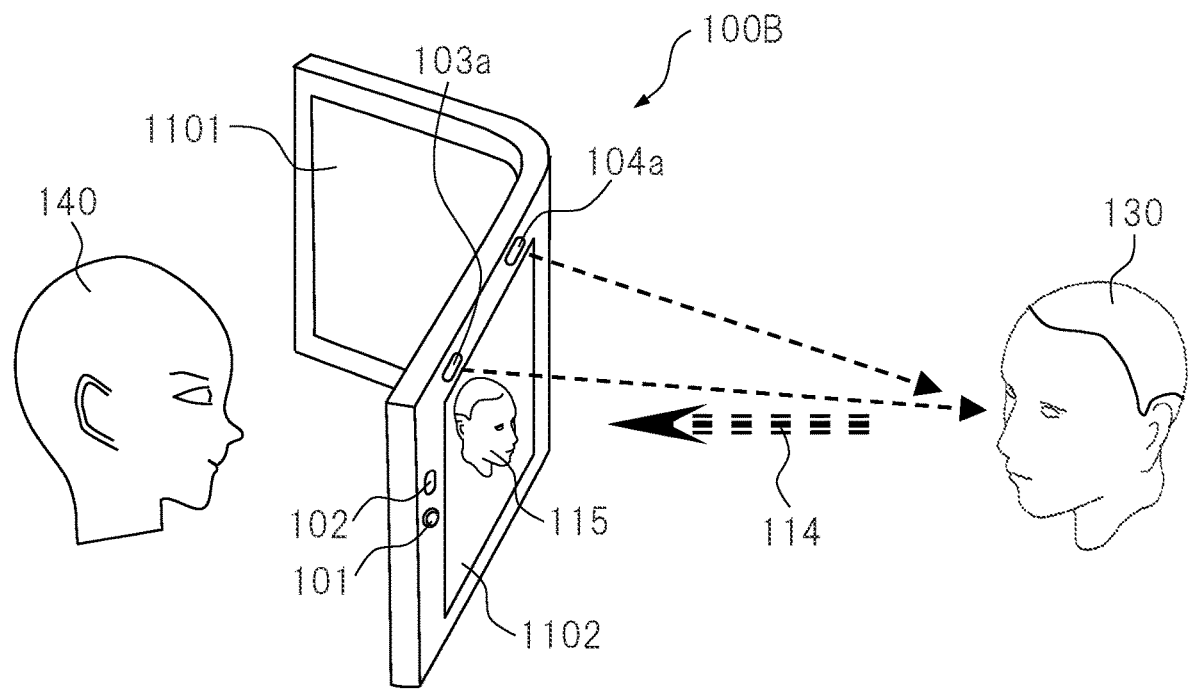
FIG. 26 is a diagram for describing another example of the eighth embodiment.

FIG. 25 is a diagram schematically showing the configuration having the flexible display on the inner surface of the foldable mobile terminal device 100B, and FIG. 26 is a diagram schematically showing the overall appearance of the mobile terminal device in the folded state.

Note that since the components in FIG. 25 and FIG. 26 denoted by the same reference characters as those in the first embodiment have the same configurations as those described in the first embodiment, detailed description thereof will be omitted.

The mobile terminal device 100B has a first display 1101 composed of a flexible panel on the foldable inner surface as shown in FIG. 25 and a second display 1102 composed of an unfoldable flat panel made of a glass substrate on the outer surface on the side of the person to be photographed 130 as shown in FIG. 26. When the first display 1001 is in an open state, the photographer 140 can see the image from the mobile terminal device 100B on a large screen. On the other hand, the mirror image 115 shown like a laterally inverted image in a mirror is displayed on the second display 1102 which can be seen from the person to be photographed 130 only when the line of sight of the person to be photographed 130 being imaged by the camera 101 is directed to the second display 1102 which can be seen from the person to be photographed 130, the camera 101, or at least the mobile terminal device 100B itself.

Therefore, even in the mobile terminal device 100B having the first display 1101 composed of a flexible panel on the inner surface, it is possible to provide the second display 1102 on the outer surface on the side of the person to be photographed 130 and display the figure of the person to be photographed 130 being imaged on the second display 1102 on the side of the person to be photographed 130 with the mirror image 115 that is easy to see from the person to be photographed 130 only when the person to be photographed 130 is gazing at the mobile terminal device 100B during imaging.

As a result, it is possible to suppress wasteful power consumption by preventing unnecessary display when the person to be photographed 130 is not looking, and the person to be photographed 130 can easily and conveniently visually check how he or she appears in the image during imaging. Furthermore, it is also possible to provide a display on the outer surface located on the side of the photographer 140 in the folded state such that the photographer 140 can visually check the image being photographed.

In the foregoing, the invention made by the inventors of this application has been specifically described based on the embodiments, but it is needless to say that the present invention is not limited to the embodiments described above and can be modified in various ways within the scope not departing from the gist thereof.

For example, the embodiments above have been described in detail in order to make the technical idea of the present invention easily understood, and the present invention is not necessarily limited to the embodiments having all of the described configurations. Also, part of the configuration of one embodiment may be replaced with the configuration of another embodiment, and the configuration of one embodiment may be added to the configuration of another embodiment. Furthermore, another configuration may be added to part of the configuration of each embodiment, and part of the configuration of each embodiment may be eliminated or replaced with another configuration.

Each configuration, function, processor, processing function, and the like described above may be realized by hardware by designing part or all of them by, for example, integrated circuits. However, each configuration, function, and the like described above may be realized by software by interpreting and executing the program for realizing each function by the processor. Information such as programs, tables, and files for realizing each function can be stored in a memory, a storage device such as a hard disk or an SSD (Solid State Drive), or a storage medium.

The control lines and information lines that are considered to be necessary for description are illustrated, and all of the control lines and information lines in the product are not necessarily illustrated. In practice, it is safe to assume that almost all configurations are connected to each other.

REFERENCE SIGNS LIST 100 mobile terminal device
100A mobile terminal device
100B mobile terminal device
101 camera
102 depth sensor
103a first left-eye line of sight detector
103b second left-eye line of sight detector
104a first right-eye line of sight detector
104b second right-eye line of sight detector
105 camera operation switch
106 display
107 display part
108 display part
109 non-display part
113 image
114 line of sight direction
115 mirror image
130 person to be photographed
140 photographer
201 folding state detector
202 acceleration sensor
203 gyro sensor
204 geomagnetic sensor
205 control unit
206 program
207 information data
208 memory
209 touch panel
210 microphone
211 speaker
212 vibration generator
213 communication interface
214 transmission/reception antenna
215 bus
301 Hall element
302 Hall element
303 magnet
304 magnet
401 imaging unit
402 first display part
403 second display part
404 line of sight direction detection unit
405 identification unit
406 line of sight direction detector
407 determination unit
408 display control unit
409 folding state detection unit
410 image processing unit
411 input operation unit
412 first touch panel unit
413 second touch panel unit
414 overlap determination unit
415 data storage unit
500 person to be photographed
510 mirror image
510A processed image
520 frame
600 person to be photographed
601 person to be photographed
602 person to be photographed
610 processed image
611 processed image
612 processed image
612A processed image
620 processed image
621 processed image
622 processed image
622A processed image
630 frame
700 holding hand
700A blocked range
800 person to be photographed
810A image region
810B image region
810C image region
820 region
830 region
840 region
850 region
901 camera
902 depth sensor
903 direction
904 direction
905 direction
906 direction
1001 main display
1002 sub-display

The invention claimed is:

1. A mobile terminal device comprising:
an imaging unit configured to image a person to be photographed;
a first display part configured to display an image captured by the imaging unit;
a second display part configured to display a processed image obtained by processing the image;
a line of sight direction detection unit configured to detect a line of sight direction of the person to be photographed;
a determination unit configured to determine whether or not the person to be photographed is facing a presence direction of the mobile terminal device based on a detection result of the line of sight direction detection unit; and
a display control unit configured to control display/non-display of the processed image on the second display part based on a determination result of the determination unit,
wherein the first display part is provided at a position that can be visually recognized by a photographer,
wherein the second display part is provided at a position that can be visually recognized by the person to be photographed, and
wherein the display control unit is configured to display the processed image on the second display part when the determination unit has determined that the person to be photographed is facing the presence direction of the mobile terminal device, and is configured not to display the processed image when the determination unit has determined that the person to be photographed is not facing the presence direction of the mobile terminal device.

2. The mobile terminal device according to claim 1, wherein the processed image is a mirror image with respect to the image.

3. The mobile terminal device according to claim 1, wherein the mobile terminal device is configured to be flexible and foldable,
wherein the first display part and the second display part form a flat integrated display unit when the mobile terminal device is not folded, and
wherein the first display part and the second display part are arranged at mutually opposite positions when the mobile terminal unit is folded.

4. The mobile terminal device according to claim 3, further comprising:
a folding state detection unit configured to detect whether or not the mobile terminal device is folded.

5. The mobile terminal device according to claim 4, wherein the mobile terminal device is configured to be able to display the image on the integrated display unit when the folding state detection unit has detected that the mobile terminal device is in an unfolded state, and
wherein the mobile terminal device is configured to be able to display the image on the first display part and display the processed image on the second display part when the folding state detection unit has detected that the mobile terminal device is in a folded state.

6. The mobile terminal device according to claim 1, wherein the line of sight direction detection unit includes:
an identification unit configured to identify eyes of the person to be photographed; and
a line of sight direction detector configured to detect the line of sight direction of the person to be photographed based on movements of the eyes identified by the identification unit.

7. The mobile terminal device according to claim 6, wherein the identification unit includes a depth sensor configured to stereoscopically capture a shape, and
wherein the identification unit is configured to identify the eyes of the person to be photographed based on an output of the depth sensor.

8. The mobile terminal device according to claim 1, wherein the line of sight direction detection unit is configured to detect the line of sight direction of the person to be photographed by analyzing the image.

9. The mobile terminal device according to claim 1, further comprising:
an image processing unit configured to expand an image region of the person to be photographed included in the image and generate the processed image subjected to mirror image processing,
wherein the second display part is configured to display the processed image generated by the image processing unit.

10. The mobile terminal device according to claim 1, further comprising:
an input operation unit configured to be able to specify a partial image region in which a specific person to be photographed is captured in an image region of the image in which a plurality of persons to be photographed are captured; and
an image processing unit configured to expand the partial image region specified by the input operation unit and generate the processed image subjected to mirror image processing,
wherein the second display part displays the processed image generated by the image processing unit.

11. The mobile terminal device according to claim 10, wherein the input operation unit is a first touch panel unit which is on the first display part and is configured to be able to specify the partial image region from the image region of the image based on a position touched by the photographer.

12. The mobile terminal device according to claim 1, further comprising:
a second touch panel unit which is on the second display part and is configured to detect an overlapping region between the second display part and a touched object;
an overlap determination unit configured to determine whether or not the overlapping region detected by the second touch panel unit and an image region of the person to be photographed included in the processed image displayed on the second display part overlap in plan view; and
an image processing unit configured to perform image processing on the processed image such that the image region of the person to be photographed does not overlap the overlapping region in plan view when the overlap determination unit has determined that the overlapping region and the image region of the person to be photographed overlap in plan view,
wherein the second display part is configured to display the processed image subjected to the image processing in the image processing unit.

13. The mobile terminal device according to claim 1, wherein the imaging unit is provided at a position where it can image the person to be photographed even when the mobile terminal device is folded, and the line of sight direction detection unit is also provided at a position where it can detect the line of sight direction of the person to be photographed.

14. The mobile terminal device according to claim 1, further comprising:
a housing structure in which the imaging by the imaging unit and the detection of the line of sight direction by the line of sight direction detection unit are not hindered even when the mobile terminal device is folded.

* * * * *